US 11,523,395 B2

(12) United States Patent
Zhang et al.

(10) Patent No.: US 11,523,395 B2
(45) Date of Patent: *Dec. 6, 2022

(54) TRANSMISSION DIRECTION CONFIGURATION METHOD, DEVICE, AND SYSTEM

(71) Applicant: Huawei Technologies Co., Ltd., Shenzhen (CN)

(72) Inventors: Lili Zhang, Beijing (CN); Guorong Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 114 days.

This patent is subject to a terminal disclaimer.

(21) Appl. No.: 17/061,242

(22) Filed: Oct. 1, 2020

(65) Prior Publication Data

US 2021/0092730 A1 Mar. 25, 2021

Related U.S. Application Data

(63) Continuation of application No. 16/570,767, filed on Sep. 13, 2019, now Pat. No. 10,834,730, which is a (Continued)

(51) Int. Cl.
*H04W 72/04* (2009.01)
*H04B 7/26* (2006.01)
(Continued)

(52) U.S. Cl.
CPC ........ *H04W 72/048* (2013.01); *H04B 7/2656* (2013.01); *H04L 5/0053* (2013.01); *H04L 5/14* (2013.01); *H04W 72/042* (2013.01)

(58) Field of Classification Search
CPC ............ C12Q 1/6883; C12Q 2600/156; C12Q 2600/158; C12Q 2600/172; H04B 7/2656;
(Continued)

(56) References Cited

U.S. PATENT DOCUMENTS

2009/0185632 A1 7/2009 Cai et al.
2013/0163532 A1* 6/2013 Anderson ............. H04L 5/0094
370/329
(Continued)

FOREIGN PATENT DOCUMENTS

CN 102131295 A 7/2011
CN 102695276 A 9/2012
(Continued)

OTHER PUBLICATIONS

"Discussion on new frame structure for latency reduction in TDD," 3GPP TSG RAN WG1 Meeting #84, R1-160754, St. Julian's, Malta, Total 9 pages, 3rd Generation Partnership Project, Valbonne, France (Feb. 15-19, 2016).

(Continued)

*Primary Examiner* — Zhensheng Zhang
(74) *Attorney, Agent, or Firm* — Leydig, Voit & Mayer, Ltd.

(57) ABSTRACT

Embodiments of this application provide a transmission direction configuration method, a device, and a system, and relate to the field of communications technologies. A specific solution is as follows: a terminal device receives first indication information from a network device, the first indication information is used to indicate a configuration of uplink and downlink transmission directions, the configuration is used to describe types, a number, and distribution of resource elements comprised in one period, the resource granularity comprises a time domain granularity, the time domain granularity comprises (OFDM) symbol, the types of the resource elements comprise at least one of an uplink resource element, a downlink resource element, or a switch resource element between the downlink resource element and the uplink resource element; and performs information
(Continued)

transmission indicated by the first indication information, of the uplink and/or downlink transmission directions.

19 Claims, 7 Drawing Sheets

Related U.S. Application Data continuation of application No. PCT/CN2017/082614, filed on Apr. 28, 2017.

(51) Int. Cl.
*H04L 5/00* (2006.01)
*H04L 5/14* (2006.01)

(58) Field of Classification Search
CPC ... H04L 5/0044; H04L 5/0053; H04L 5/0073; H04L 5/0092
See application file for complete search history.

(56) References Cited

U.S. PATENT DOCUMENTS

| | | | |
|---|---|---|---|
| 2015/0043397 A1 | 2/2015 | Hsieh et al. | |
| 2016/0226650 A1 | 8/2016 | Chen et al. | |
| 2016/0278118 A1 | 9/2016 | Yerramalli et al. | |
| 2016/0353476 A1 | 12/2016 | Sartori et al. | |
| 2017/0026944 A1 | 1/2017 | Li et al. | |
| 2018/0270848 A1* | 9/2018 | Liang | H04W 72/1268 |

FOREIGN PATENT DOCUMENTS

| | | |
|---|---|---|
| CN | 103517422 A | 1/2014 |
| CN | 103687019 A | 3/2014 |
| CN | 104105203 A | 10/2014 |
| CN | 106255215 A | 12/2016 |
| CN | 106341891 A | 1/2017 |
| EP | 2509380 B1 | 6/2019 |
| WO | 2014044177 A1 | 3/2014 |
| WO | 2015013862 A1 | 2/2015 |
| WO | 2016122845 A1 | 8/2016 |
| WO | 2018097680 A1 | 5/2018 |

OTHER PUBLICATIONS

"Further Considerations on NR/LTE Coexistence," 3GPP TSG RAN WG1 NR Ad-Hoc Meeting, R1-1700390, Spokane, USA, Total 4 pages, 3rd Generation Partnership Project, Valbonne, France (Jan. 16-20, 2017).
"Discussion on DCI in NR," 3GPP TSG RAN WG1 NR Ad-Hoc Meeting, R1-1700440, Spokane, USA, Total 5 pages, 3rd Generation Partnership Project, Valbonne, France (Jan. 16-20, 2017).
"Discussion on TDD operation on an unpaired spectrum," 3GPP TSG RAN WG1 Meeting #88, R1-1701670, Athens, Greece, Total 3 pages, 3rd Generation Partnership Project, Valbonne, France (Feb. 13-17, 2017).
"Discussion on semi-static TDD configurations," 3GPP TSG RAN WG1 Meeting #88, R1-1703410, Athens, Greece, Total 4 pages, 3rd Generation Partnership Project, Valbonne, France (Feb. 13-17, 2017).
"On dynamic and semi-static operation," 3GPP TSG RAN WG1 Meeting #88bis, R1-1704244, Spokane, USA, Total 3 pages, 3rd Generation Partnership Project, Valbonne, France (Apr. 3-7, 2017).
"Correction to PRACH resource configuration for high speed scenario," 3GPP TSG-RAN Meeting #75, Dubrovnik, Croatia, RP-170321, pp. 1-5, 3rd Generation Partnership Project, Valbonne, France (Mar. 6-9, 2017).
"3rd Generation Partnership Project; Technical Specification Group Radio Access Network; Evolved Universal Terrestrial Radio Access (E-UTRA); Physical channels and modulation (Release 14)," 3GPP TS 36.211 V14.1.0, pp. 1-175, 3rd Generation Partnership Project, Valbonne, France (Dec. 2016).
"3rd Generation Partnership Project; Technical Specification Group Radio Access Network; Evolved Universal Terrestrial Radio Access (E-UTRA); Physical layer procedures (Release 14)," 3GPP TS 36.213 V14.1.0, pp. 1-414, 3rd Generation Partnership Project, Valbonne, France (Dec. 2016).
"New study item proposal for UL-DL Flexibility and Interference Management in LTE TDD," 3GPP TSG-RAN Meeting #50, Istanbul, Turkey, RP-101265, pp. 1-5, 3rd Generation Partnership Project, Valbonne, France (Dec. 7-10, 2010).
"New Study Item Proposal: DL-UL Interference Management for TDD EUTRA," 3GPP TSG RAN#50, Istanbul, Turkey, RP-101241, pp. 1-5, 3rd Generation Partnership Project, Valbonne, France (Dec. 7-10, 2010).
"Dynamic TDD slot structure," 3GPP TSG RAN WG1 Meeting #88, Athens, Greece, R1-1702112, pp. 1-3, 3rd Generation Partnership Project, Valbonne, France (Feb. 13-17, 2017).
Chih-Lin I et al., "New Paradigm of 5G Wireless Internet," IEEE Journal on Selected Areas in Communications, vol. 34, No. 3, pp. 474-482, Institute of Electrical and Electronics, Engineers, New York, New York (Mar. 2016).
"BS Demodulation performance requirements for eIMTA," 3GPP TSG-RAN WG4 Meeting #70bis, San Jose del Cabo, Mexico, R4-141691, Total 6 pages, 3rd Generation Partnership Project, Valbonne, France (Mar. 31-Apr. 4, 2014).
CN/202110687292.0, Notice of Allowance/Search Report, dated Jul. 19, 2022.
U.S. Appl. No. 16/570,767, filed Sep. 13, 2019.

\* cited by examiner

| Mode number | Period | Subframe number | | | | | | | | | |
|---|---|---|---|---|---|---|---|---|---|---|---|
| | | 0 | 1 | 2 | 3 | 4 | 5 | 6 | 7 | 8 | 9 |
| #0 | 5 ms | D | S | U | U | U | D | S | U | U | U |
| #1 | 5 ms | D | S | U | U | D | D | S | U | U | D |
| #2 | 5 ms | D | S | U | D | D | D | S | U | D | D |
| #3 | 10 ms | D | S | U | U | U | D | D | D | D | D |
| #4 | 10 ms | D | S | U | U | D | D | D | D | D | D |
| #5 | 10 ms | D | S | U | D | D | D | D | D | D | D |
| #6 | 5 ms | D | S | U | U | U | D | S | U | U | D |
FIG. 1
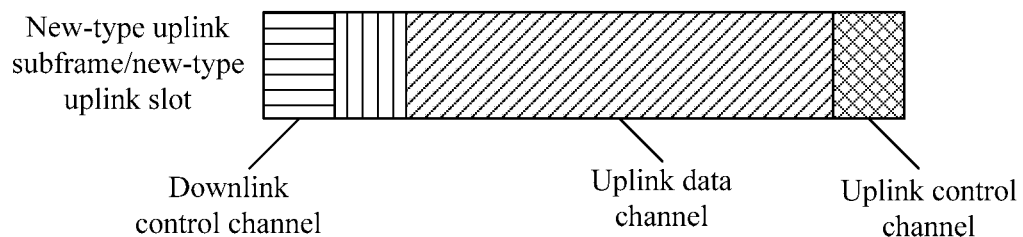
FIG. 2a
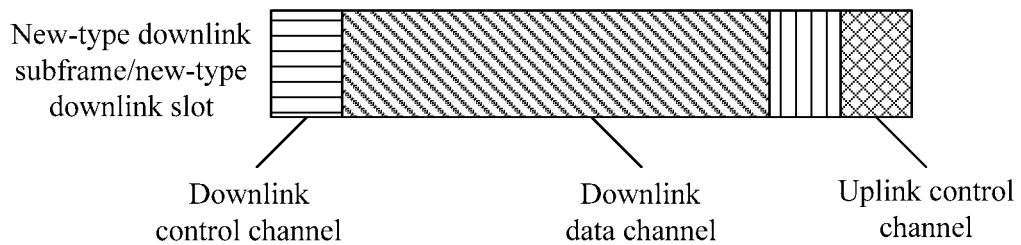
FIG. 2b

TRANSMISSION DIRECTION CONFIGURATION METHOD, DEVICE, AND SYSTEM

CROSS-REFERENCE TO RELATED APPLICATIONS

This application is a continuation of U.S. patent application Ser. No. 16/570,767, filed on Sep. 13, 2019, which is a continuation of International Application No. PCT/CN2017/082614, filed on Apr. 28, 2017, which claims priority to Chinese Patent Application No. 201710158113.8, filed on Mar. 16, 2017. All of the aforementioned patent applications are hereby incorporated by reference in their entireties.

TECHNICAL FIELD

Embodiments of this application relate to the field of communications technologies, and in particular, to a transmission direction configuration method, a device, and a system.

BACKGROUND

Time division duplexing (TDD) is a time division multiplexing communications technology used in a mobile communications system. Seven configuration modes shown in FIG. 1 are specified in 3rd Generation Partnership Project (3GPP) TS36.211. Each configuration mode is used to indicate whether a transmission direction of each of ten subframes included in one period is an uplink direction or a downlink direction and whether the subframe is a special subframe.

In a current mobile communications network, a base station serving a cell selects one from the seven configuration modes based on factors such as a service requirement that is collected in a long time, and notifies a terminal or another base station of the selected configuration mode in a static or semi-static configuration manner, so that the terminal can transmit information to the base station based on uplink and/or downlink transmission directions specified in the configuration mode, and the another base station can perform interference processing, scheduling control or another configuration operation based on the configuration mode.

As mobile communications technologies evolve, a cell radius is increasingly small, a quantity of terminals connected to each base station is increasingly small, and a cell service increasingly fluctuates. Therefore, a resource transmission direction needs to be more flexibly configured for information transmission, so as to adapt to more dynamic service changes. However, in the prior art, a resource transmission direction is usually configured only by selecting one from the foregoing several configuration modes. Consequently, a dynamically changing service requirement cannot be satisfied.

SUMMARY

Embodiments of this application provide a transmission direction configuration method, a device, and a system, so as to flexibly configure uplink and/or downlink transmission directions.

To achieve the foregoing objectives, the following technical solutions are used in the embodiments of this application:

According to a first aspect, an embodiment of this application provides a transmission direction configuration method. The method includes: sending, by a first device, first indication information to a second device, where the first indication information is used to indicate a configuration of uplink and/or downlink transmission directions, the configuration is used to describe types, a number, and distribution of resource elements included in one period, the resource element is a resource that is obtained through division based on a resource granularity, the resource granularity includes a time domain granularity, the time domain granularity includes a resource unit smaller than one orthogonal frequency division multiplexing (OFDM) symbol, an OFDM symbol, a mini slot, a slot, a mini subframe, a subframe, a radio frame, or a super frame, the types of the resource elements include an uplink resource element, a downlink resource element, and a switch resource element between the downlink resource element and the uplink resource element, a transmission direction of the uplink resource element is an uplink direction, and a transmission direction of the downlink resource element is a downlink direction; and performing, by the first device, information transmission based on the configuration, indicated by the first indication information, of the uplink and/or downlink transmission directions.

In this way, division of the resource elements may not be limited to a form of a subframe as in the prior art, and a smaller or larger resource unit may be obtained through division, so that resource division is more flexible. When the uplink and/or downlink transmission directions are configured based on the resource elements that are in various forms and different in size, a transmission direction of a resource may be more flexibly configured. In addition, the number of resource elements included in one period is not limited, and more types of resource elements may be included. In this case, different types and different quantities of resource elements may correspond to more distribution manners. In other words, there are more configuration modes or structures. In this way, an uplink or downlink transmission direction of a resource element is more flexibly configured.

With reference to the first aspect, in a possible implementation, the first device sends a period to the second device by using at least one of high layer signaling, Media Access Control (MAC) layer signaling, or physical layer signaling. In this way, the first device may notify the second device of a configured period value in a semi-static or dynamic configuration manner.

With reference to the first aspect and the foregoing possible implementation, in a possible implementation, the sending, by the first device, a period to the second device by using high layer signaling includes: sending, by the first device, the period to the second device by using system information. In this way, the first device may notify the second device of the period by using important system information.

With reference to the first aspect and the foregoing possible implementations, in another possible implementation, when the time domain granularity is a subframe, the uplink resource element includes at least one of a first uplink subframe and a second uplink subframe, and the downlink resource element includes at least one of a first downlink subframe and a second downlink subframe. The first uplink subframe is a normal uplink subframe, the first downlink subframe is a normal downlink subframe, the second uplink subframe includes transmission on a downlink control channel, an uplink data channel, and an uplink control channel, and the second downlink subframe includes transmission on a downlink control channel, a downlink data channel, and an uplink control channel.

In this way, compared with the prior art, in a configuration mode in this embodiment of this application, the resource elements in the period may be in a plurality of forms. When the resource elements in the period are subframes, the subframes herein may further include a self-contained uplink subframe and a self-contained downlink subframe, in addition to the normal downlink subframe, the normal uplink subframe, and special subframes. These subframes may correspond to different distribution situations or different structures in different configurations. In this way, more configuration modes may be obtained in this embodiment of this application, to more flexibly configure a transmission direction of a resource.

With reference to the first aspect and the foregoing possible implementations, in another possible implementation, when the time domain granularity is a slot, the uplink resource element includes at least one of a first uplink slot and a second uplink slot, and the downlink resource element includes at least one of a first downlink slot and a second downlink slot. The first uplink slot is a normal uplink slot, the first downlink slot is a normal downlink slot, the second uplink slot includes transmission on a downlink control channel, an uplink data channel, and an uplink control channel, and the second downlink slot includes transmission on a downlink control channel, a downlink data channel, and an uplink control channel.

In this way, compared with the prior art, in a configuration mode in this embodiment of this application, the resource elements in the period may be in a plurality of forms. When the resource elements in the period are slots, the slots herein may further include a self-contained uplink slot and a self-contained downlink slot, in addition to the normal downlink slot, the normal uplink slot, and special slots. These slots may correspond to different distribution situations or different structures in different configurations. In this way, more configuration modes may be obtained in this embodiment of this application, to more flexibly configure a transmission direction of a resource.

With reference to the first aspect and the foregoing possible implementations, in another possible implementation, the resource granularity further includes a frequency domain granularity, and the frequency domain granularity includes a physical resource block (PRB), a control channel element (CCE), a sub-band, or a frequency band. In this way, the resource elements may be more flexibly and finely divided in two dimensions, namely, the time domain granularity and the frequency domain granularity, so that an uplink or downlink transmission direction is more flexibly configured based on a resource element.

With reference to the first aspect and the foregoing possible implementations, in another possible implementation, that the configuration is used to describe types, a number, and distribution of resource elements included in one period includes: the configuration is used to describe types, a number, and distribution of resource elements included in a current period or in a k period after a current period, where k is a positive integer.

In this way, when a related service changes, the first device may indicate, in real time, uplink and/or downlink transmission directions of resource elements in the current period or a period after the current period to the second device, so that information transmission can be performed in the current period or in the period after the current period based on a newly configured uplink or downlink transmission direction, thereby responding to a dynamically-changing service requirement in a timely manner.

With reference to the first aspect and the foregoing possible implementations, in another possible implementation, the first indication information is used to directly indicate uplink and/or downlink transmission directions of resource elements in one period. In this way, the uplink and/or downlink transmission directions may be more directly configured.

With reference to the first aspect and the foregoing possible implementations, in another possible implementation, the first indication information includes identification information, and the identification information is used to indicate the configuration of the uplink and/or downlink transmission directions. Before the sending, by a first device, first indication information to a second device, the method further includes: sending, by the first device, initial configuration information to the second device, or configuring initial configuration information in advance by using an operation, administration, and maintenance (OAM) center, where the initial configuration information includes a correspondence between the identification information and the configuration of the uplink and/or downlink transmission directions.

In this way, the first device may configure the initial configuration information in advance and notify the second device of the initial configuration information, so that only the first indication information whose amount is relatively small needs to be sent during configuration of the uplink and/or downlink transmission directions.

With reference to the first aspect and the foregoing possible implementations, in another possible implementation, the sending, by a first device, first indication information to a second device includes: sending, by the first device, the first indication information to the second device by using at least one of high layer signaling, Media Access Control MAC layer signaling, or physical layer signaling.

In this way, the first indication information may be sent to the second device in a semi-static configuration manner by using the high layer signaling, or the first indication information may be sent to the second device in a dynamic configuration manner by using either of the MAC layer signaling or the physical layer signaling.

With reference to the first aspect and the foregoing possible implementations, in another possible implementation, the first device is configured with a first parameter. When the first parameter is a first preset value, the sending, by a first device, first indication information to a second device includes: sending, by the first device, the first indication information to the second device by using the high layer signaling. When the first parameter is a second preset value, the sending, by a first device, first indication information to a second device includes: sending, by the first device, the first indication information to the second device by using the at least one of the MAC layer signaling or the physical layer signaling.

In this way, through switching of the first parameter between the first preset value and the second preset value, the first device may switch a manner of configuring uplink and/or downlink transmission directions between the semi-static configuration manner and the dynamic configuration manner or activate/deactivate the dynamic configuration manner. When a service in a cell fluctuates relatively greatly, the first device may activate the dynamic configuration manner, to respond to a dynamic service in real time. When a service in a cell fluctuates relatively slightly, the first device may configure the uplink and/or downlink transmission directions in the semi-static configuration manner, and deactivate the dynamic configuration manner, so as to reduce costs of detecting a control channel by the second device, and reduce device power consumption. In addition, when the dynamic configuration manner is used, a processing delay can be reduced by using the physical layer signaling or the MAC layer signaling, with no need to predict a service characteristic, so that the first device can efficiently adjust an uplink or downlink transmission direction of a resource element, to adapt to the service characteristic.

With reference to the first aspect and the foregoing possible implementations, the first device sends the first parameter to the second device by using at least one of high layer signaling, MAC layer signaling, or physical layer signaling. In this way, the first device may send the first parameter to the second device in the semi-static configuration manner or the dynamic configuration manner.

With reference to the first aspect and the foregoing possible implementations, the sending, by the first device, the first parameter to the second device by using high layer signaling includes: sending, by the first device, the first parameter to the second device by using system information. In this way, the first device may notify the second device of the first parameter by using the system information.

With reference to the first aspect and the foregoing possible implementations, in another possible implementation, the first indication information carries a second parameter, the second parameter is used to indicate a time duration, and the time duration includes N periods, where N is a positive integer. That the configuration is used to describe types, a number, and distribution of resource elements included in one period includes: the configuration is used to describe types, a number, and distribution of resource elements included in each of the N periods included in the time duration indicated by the second parameter.

In this way, the first indication information may indicate a configuration of uplink and/or downlink transmission directions in each of a plurality of periods included in one time window, and configurations of uplink and/or downlink transmission directions in the periods are the same.

With reference to the first aspect and the foregoing possible implementations, in another possible implementation, the first indication information carries a third parameter, the third parameter is used to indicate a time point, and that the configuration is used to describe types, a number, and distribution of resource elements included in one period includes: the configuration is used to describe types, a number, and distribution of resource elements included in each period in a time domain after the time point indicated by the third parameter.

In this way, the first indication information may indicate a configuration of uplink and/or downlink transmission directions in each period after a start time point, and configurations of uplink and/or downlink transmission directions in the periods are the same.

With reference to the first aspect and the foregoing possible implementations, in another possible implementation, the first indication information carries a second parameter and a third parameter, the second parameter is used to indicate a time duration, the third parameter is used to indicate a time point, and that the configuration is used to describe types, a number, and distribution of resource elements included in one period includes: the configuration is used to describe types, a number, and distribution of resource elements included in each period in the time duration that is indicated by the second parameter and that starts from the time point indicated by the third parameter.

In this way, the first indication information may indicate a configuration of uplink and/or downlink transmission directions in each of a plurality of periods included in one time window starting from a time point, and configurations of uplink and/or downlink transmission directions in the periods are the same.

With reference to the first aspect and the foregoing possible implementations, in another possible implementation, the first device is further configured with a second parameter, and the second parameter is used to indicate a time duration. The method further includes: sending, by the first device, second indication information to the second device by using at least one of high layer signaling, MAC layer signaling, or physical layer signaling. The second indication information carries the second parameter, and the second indication information is used to indicate that a configuration of uplink and/or downlink transmission directions in each period in the time duration indicated by the second parameter is the configuration indicated by the first indication information.

In this way, the second indication information may indicate a configuration of uplink and/or downlink transmission directions in each of a plurality of periods included in one time window, and the configuration of the uplink and/or downlink transmission directions in each period is the configuration indicated by the first indication information.

With reference to the first aspect and the foregoing possible implementations, in another possible implementation, the first device is further configured with a third parameter, and the third parameter is used to indicate a time point. The method further includes: sending, by the first device, third indication information to the second device by using at least one of high layer signaling, MAC layer signaling, or physical layer signaling, where the second indication information carries the third parameter, and the third indication information is used to indicate that a configuration of uplink and/or downlink transmission directions in each period in a time domain after the time point indicated by the third parameter is the configuration indicated by the first indication information.

In this way, the third indication information may indicate a configuration of uplink and/or downlink transmission directions in each period after a time point, and the configuration of the uplink and/or downlink transmission directions in each period is the configuration indicated by the first indication information.

With reference to the first aspect and the foregoing possible implementations, in another possible implementation, the first device is further configured with a second parameter and a third parameter, the second parameter is used to indicate a time duration, and the third parameter is used to indicate a time point. The method further includes: sending, by the first device, fourth indication information to the second device by using at least one of high layer signaling, MAC layer signaling, or physical layer signaling, where the fourth indication information carries the second parameter and the third parameter, and the fourth indication information is used to indicate that a configuration of uplink and/or downlink transmission directions in each period in the time duration that is indicated by the second parameter and that starts from the time point indicated by the third parameter is the configuration indicated by the first indication information.

In this way, the third indication information may indicate a configuration of uplink and/or downlink transmission directions in each period in a time window starting from a time point, and the configuration of the uplink and/or downlink transmission directions in each period is the configuration indicated by the first indication information.

With reference to the first aspect and the foregoing possible implementations, in another possible implementation, the sending, by the first device, the first indication information to the second device by using physical layer signaling includes: sending, by the first device, the first indication information to the second device by using a preserved physical hybrid automatic repeat request indicator channel (PHICH) resource; or sending, by the first device, the first indication information to the second device by using a preserved CCE resource in a physical downlink control channel (PDCCH) resource; or sending, by the first device, the first indication information by using a newly added PDCCH resource. The newly added PDCCH resource needs to be notified by the first device to the second device, or needs to be pre-configured through OAM. The first device may notify the second device of the newly added PDCCH resource by using high layer signaling. The new PDCCH may be at least one of a group PDCCH, a common PDCCH, or a group common PDCCH. The new PDCCH is a particular PDCCH defined for a group of UEs, or a group of time domain resources, or a group of frequency domain resources, to introduce new downlink control information (DCI).

In this way, the first device sends the first indication information on the preserved resource, so as not to increase blind detection on a second device side. In addition, a physical control format indicator channel (PCFICH), PHICH, or DCI encoding mechanism in the prior art may be reused to achieve low implementation complexity in sending the first indication information.

With reference to the first aspect and the foregoing possible implementations, in another possible implementation, the first device is configured with a first resource set and a second resource set, a transmission direction of a resource element in the first resource set is fixed, and a transmission direction of a resource element in the second resource set is variable.

In this way, the first resource set is obtained through division, so that important control information can be transmitted by using a resource element in the preserved first resource set, to improve system performance. For example, the second device may directly detect signaling in a particular resource element in the preserved first resource set, to quickly access a network.

With reference to the first aspect and the foregoing possible implementations, in another possible implementation, the method further includes: sending, by the first device, a first notification message to the second device, where the first notification message is used to inform that some or all resources in the second resource set are converted into the first resource set.

In this way, when a data amount of important control information needing to be transmitted is relatively large, some or all preserved resources in the second resource set may be grouped into the first resource set to transmit the important control information, so that resource configuration is more flexible.

With reference to the first aspect and the foregoing possible implementations, in another possible implementation, the method further includes: sending, by the first device, a second notification message to the second device, where the second notification message is used to inform that some or all resources in the first resource set are converted into the second resource set.

In this way, when a data amount of important control information needing to be transmitted is relatively small, resources in the second resource set that have been grouped into the first resource set are re-grouped into the second resource set, so that resource configuration is more flexible.

With reference to the first aspect and the foregoing possible implementations, in another possible implementation, the sending, by the first device, a first notification message and/or a second notification message to the second device includes: sending, by the first device, the first notification message and/or the second notification message to the second device by using at least one of high layer signaling, MAC layer signaling, or physical layer signaling.

In this way, the first device may notify the second device of the first notification message and/or the second notification message in the semi-static or dynamic configuration manner.

With reference to the first aspect and the foregoing possible implementations, in another possible implementation, the sending, by the first device, initial configuration information to the second device includes: sending, by the first device, the initial configuration information to the second device by using a resource element in the first resource set.

Because an amount of the initial configuration information is relatively large and the initial configuration information belongs to important system information, the initial configuration information may be transmitted by using a resource element in the first resource set.

With reference to the first aspect and the foregoing possible implementations, in another possible implementation, the sending, by a first device, first indication information to a second device includes: sending, by the first device, the first indication information to the second device by using a resource element in at least one of the first resource set and the second resource set.

In this way, the resource elements in both the first resource set and the second resource set may be used to send the first indication information. In addition, when the first indication information is sent by using a resource element in the first resource set, because a transmission direction of the resource element is fixed, not only performance can be satisfied but also interference can be reduced.

According to a second aspect, an embodiment of this application provides a transmission direction configuration method, including: receiving, by a second device, first indication information sent by a first device, where the first indication information is used to indicate a configuration of uplink and/or downlink transmission directions, the configuration is used to describe types, a number, and distribution of resource elements included in one period, the resource element is a resource that is obtained through division based on a resource granularity, the resource granularity includes a time domain granularity, the time domain granularity includes a resource unit smaller than one orthogonal frequency division multiplexing OFDM symbol, an OFDM symbol, a mini slot, a slot, a mini subframe, a subframe, a radio frame, or a super frame, the types of the resource elements include an uplink resource element, a downlink resource element, and a switch resource element between the downlink resource element and the uplink resource element, a transmission direction of the uplink resource element is an uplink direction, and a transmission direction of the downlink resource element is a downlink direction; and performing, by the second device, information transmission or a configuration operation based on the configuration, indicated by the first indication information, of the uplink and/or downlink transmission directions.

In this way, division of the resource elements may not be limited to a form of a subframe as in the prior art, and a smaller or larger resource unit may be obtained through division, so that resource division is more flexible. When the uplink and/or downlink transmission directions are configured based on the resource elements that are in various forms and different in size, a transmission direction of a resource may be more flexibly configured. In addition, the number of resource elements included in one period is not limited, and more types of resource elements may be included. In this case, different types and different quantities of resource elements may correspond to more distribution manners. In other words, there are more configuration modes. In this way, an uplink or downlink transmission direction of a resource element is more flexibly configured.

With reference to the second aspect, in a possible implementation, the first indication information includes identification information, the identification information is used to indicate the configuration of the uplink and/or downlink transmission directions, and before the receiving, by a second device, first indication information to a first device, the method further includes:

receiving, by the second device, initial configuration information sent by the first device, or configuring initial configuration information in advance by using an operation, administration, and maintenance OAM center, where the initial configuration information includes a correspondence between the identification information and the configuration of the uplink and/or downlink transmission directions.

In this way, the second device may learn an uplink or downlink transmission direction of a resource element by combining the initial configuration information and the identification information in the first indication information.

With reference to the second aspect and the foregoing possible implementation, in a possible implementation, the receiving, by a second device, first indication information sent by a first device includes: receiving, by the second device by using at least one of high layer signaling, Media Access Control MAC layer signaling, or physical layer signaling, the first indication information sent by the second device.

In this way, the second device may receive, in a semi-static configuration manner, the first indication information sent by the first device; or the second device may receive, in a dynamic configuration manner, the first indication information sent by the first device.

With reference to the second aspect and the foregoing possible implementation, in a possible implementation, when a first parameter is a first preset value, the sending, by a first device, first indication information to a second device includes: sending, by the first device, the first indication information to the second device by using the high layer signaling. When the first parameter is a second preset value, the sending, by a first device, first indication information to a second device includes: sending, by the first device, the first indication information to the second device by using the at least one of the MAC layer signaling or the physical layer signaling.

In this way, the second device may receive the first indication information based on different values of the first parameter in a semi-static or dynamic manner, so as to configure an uplink or downlink transmission direction of a resource element.

According to a third aspect, an embodiment of this application provides a first device, including: a sending unit, configured to send first indication information to a second device, where the first indication information is used to indicate a configuration of uplink and/or downlink transmission directions, the configuration is used to describe types, a number, and distribution of resource elements included in one period, the resource element is a resource that is obtained through division based on a resource granularity, the resource granularity includes a time domain granularity, the time domain granularity includes a resource unit smaller than one orthogonal frequency division multiplexing OFDM symbol, an OFDM symbol, a mini slot, a slot, a mini subframe, a subframe, a radio frame, or a super frame, the types of the resource elements include an uplink resource element, a downlink resource element, and a switch resource element between the downlink resource element and the uplink resource element, a transmission direction of the uplink resource element is an uplink direction, and a transmission direction of the downlink resource element is a downlink direction; and a processing unit, configured to perform information transmission based on the configuration, indicated by the first indication information, of the uplink and/or downlink transmission directions.

According to a fourth aspect, an embodiment of this application provides a second device, including: a receiving unit, configured to receive first indication information sent by a first device, where the first indication information is used to indicate a configuration of uplink and/or downlink transmission directions, the configuration is used to describe types, a number, and distribution of resource elements included in one period, the resource element is a resource that is obtained through division based on a resource granularity, the resource granularity includes a time domain granularity, the time domain granularity includes a resource unit smaller than one orthogonal frequency division multiplexing OFDM symbol, an OFDM symbol, a mini slot, a slot, a mini subframe, a subframe, a radio frame, or a super frame, the types of the resource elements include an uplink resource element, a downlink resource element, and a switch resource element between the downlink resource element and the uplink resource element, a transmission direction of the uplink resource element is an uplink direction, and a transmission direction of the downlink resource element is a downlink direction; and a processing unit, configured to perform information transmission or a configuration operation based on the configuration, indicated by the first indication information, of the uplink and/or downlink transmission directions.

According to a fifth aspect, an embodiment of this application provides a first device, including at least one processor, a memory, a bus, and a communications interface, where the memory is configured to store a computer executable instruction, the at least one processor is connected to the memory by using the bus, and when the first device runs, the at least one processor executes the computer executable instruction stored in the memory, so that the first device performs the configuration method according to any one of the first aspect or the implementations of the first aspect.

According to a sixth aspect, an embodiment of this application provides a second device, including at least one processor, a memory, a bus, and a communications interface, where the memory is configured to store a computer executable instruction, the at least one processor is connected to the memory by using the bus, and when the second device runs, the at least one processor executes the computer executable instruction stored in the memory, so that the second device performs the configuration method according to any one of the second aspect or the implementations of the second aspect.

According to a seventh aspect, an embodiment of this application provides a computer readable storage medium, configured to store a computer software instruction used in the first aspect, so that when the computer software instruction is run on a first device, the first device performs the configuration method according to any one of the first aspect or the implementations of the first aspect.

According to an eighth aspect, an embodiment of this application provides a computer readable storage medium, configured to store a computer software instruction used in the second aspect, so that when the computer software instruction is run on a second device, the second device performs the configuration method according to any one of the second aspect or the implementations of the second aspect.

According to a ninth aspect, an embodiment of this application provides a computer program product including an instruction, so that when the computer program product is run on a first device, the first device performs the configuration method according to any one of the first aspect or the implementations of the first device.

According to a tenth aspect, an embodiment of this application provides a computer program product including an instruction, so that when the computer program product is run on a second device, the second device performs the configuration method according to any one of the second aspect or the implementations of the second aspect.

According to an eleventh aspect, an embodiment of this application provides a system, including the first device according to any one of the first aspect or the implementations of the first aspect and the second device according to any one of the second aspect or the implementations of the second aspect.

BRIEF DESCRIPTION OF DRAWINGS

FIG. 1 shows a mode of configuring uplink and/or downlink transmission directions provided in the prior art;

FIG. 2a is a schematic structural diagram of a new-type uplink subframe/new-type uplink slot according to an embodiment of this application;

FIG. 2b is a schematic structural diagram of a new-type downlink subframe/new-type downlink slot according to an embodiment of this application;

DESCRIPTION OF EMBODIMENTS

Figure 3:
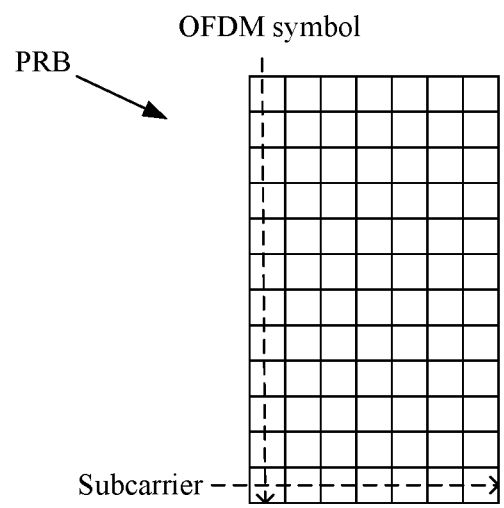
FIG. 3 is a schematic structural diagram of a physical resource block according to an embodiment of this application.

The following describes the technical solutions in the embodiments of this application with reference to the accompanying drawings in the embodiments of this application. In the description of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the description of this application, "a plurality of" means two or more.

For ease of understanding, some descriptions of related concepts in this application are provided as examples for reference as follows:

Special subframe: a switch subframe located between a downlink subframe and an uplink subframe.

Static configuration: configuration usually performed by using pre-configuration or by using a network planning method.

Dynamic configuration: a real-time configuration manner, or a configuration manner with a relatively high change frequency.

Semi-static configuration: configuration between the static configuration and the dynamic configuration, with a relatively low change frequency. Semi-static configuration is a configuration manner with a relatively long configuration period, or a configuration manner with relatively long configuration duration, and is usually performed by using high layer signaling.

Resource element: a resource unit that is obtained through division based on a resource granularity.

New-type subframe: also referred to as a self-contained subframe, a new radio subframe, a bidirectional subframe, or a mixed subframe. New-type subframes may include new-type downlink subframes and new-type uplink subframes. As shown in FIG. 2a, a new-type uplink subframe may include transmission on a downlink control channel, an uplink data channel, and an uplink control channel. A new-type downlink subframe may include transmission on a downlink control channel, a downlink data channel, and an uplink control channel. The new-type uplink subframe may also be referred to as an uplink dominant subframe or an uplink centric subframe. The new-type downlink subframe may also be referred to as a downlink dominant subframe or a downlink centric subframe. In the following embodiments of this application, the new-type uplink subframe is a second uplink subframe, and the new-type downlink subframe is a second downlink subframe. In the second uplink subframe, the downlink control channel occupies first several OFDM symbols (e.g., first two or first three OFDM symbols) of a subframe, the uplink control channel occupies last several OFDM symbols (e.g., last two or last three OFDM symbols) of the subframe, the uplink data channel occupies an OFDM symbol between the downlink control channel and the uplink control channel, and there is a switch interval or a guard interval between the downlink control channel and the uplink data channel. In the second downlink subframe, the downlink control channel occupies first several OFDM symbols (e.g., first two or first three OFDM symbols) of a subframe, the uplink control channel occupies last several OFDM symbols (e.g., last two or last three OFDM symbols) of the subframe, the downlink data channel occupies an OFDM symbol between the downlink control channel and the uplink control channel, and there is a switch interval or a guard interval between the downlink data channel and the uplink control channel.

New-type slot: also referred to as a self-contained slot, a new radio slot, a bidirectional slot, or a mixed slot. New-type slots may include new-type downlink slots and new-type uplink slots. As shown in FIG. 2*a*, a new-type uplink slot may include transmission on a downlink control channel, an uplink data channel, and an uplink control channel. A new-type downlink slot may include transmission on a downlink control channel, a downlink data channel, and an uplink control channel. In the following embodiments of this application, the new-type uplink slot is a second uplink slot, and the new-type downlink slot is a second downlink slot. In the second uplink slot, the downlink control channel occupies first several OFDM symbols (e.g., first two or first three OFDM symbols) of a subframe, the uplink control channel occupies last several OFDM symbols (e.g., last two or last three OFDM symbols) of the subframe, the uplink data channel occupies an OFDM symbol between the downlink control channel and the uplink control channel, and there is a switch interval or a guard interval between the downlink control channel and the uplink data channel. In the second downlink slot, the downlink control channel occupies first several OFDM symbols (e.g., first two or first three OFDM symbols) of a subframe, the uplink control channel occupies last several OFDM symbols (e.g., last two or last three OFDM symbols) of the subframe, the downlink data channel occupies an OFDM symbol between the downlink control channel and the uplink control channel, and there is a switch interval or a guard interval between the downlink data channel and the uplink control channel.

Mini subframe: a subframe including a smaller quantity of orthogonal frequency division multiplexing OFDM symbols.

Mini slot: a slot including a smaller quantity of OFDM symbols.

Physical resource block (PRB): A physical resource block shown in FIG. 3 includes a total of 12 rows and 7 columns, where each column represents one OFDM symbol, and each row represents one subcarrier. The PRB corresponds to 12 consecutive subcarriers in frequency domain and corresponds to one slot in time domain.

Resource element (RE): A resource element corresponds to one subcarrier in frequency and corresponds to one OFDM symbol in time domain.

Sub-band: A sub-band includes several subcarriers.
Frequency band: a frequency band of an entire carrier.
Slot: Seven OFDM symbols correspond to one slot.
Subframe: One subframe includes two slots.
Radio frame: One radio frame includes 10 subframes.
Super frame: One super frame includes 51 multiframes, and one multiframe includes 26 subframes.

The technical solutions provided in the embodiments of this application are described below with reference to the accompanying drawings.

The technical solutions provided in the embodiments of this application may be applied to various mobile communications systems, for example, a current 3GPP-compliant mobile communications system, a 4th generation mobile communications technology (4G) communications system, a future evolved network such as a 5 generation mobile communications technology (5th-Generation, 5G) communications system, a Long Term Evolution (LTE) system, a 3GPP-related cellular system, and another similar communications system. Particularly, the technical solutions may be applied to a 5G ultra dense network (UDN) system. It needs to be noted that the 5G standard may include scenarios, such as machine to machine (M2M), D2M, macro-micro communication, enhanced mobile broadband (eMBB), ultra-reliable and low-latency communication (uRLLC), and massive machine type communication (mMTC). These scenarios may include but are not limited to: a scenario of communication between base stations, a scenario of communication between a base station and a terminal, a scenario of communication between and terminals, and the like. The technical solutions provided in the embodiments of this application may also be applied to a scenario in a 5G communications system, such as communication between a base station and a terminal, communication between base stations, or communication between terminals.

In the scenario of communication between a base station and a terminal, a direction in which the base station sends data to the terminal is a downlink direction, and a direction in which the base station receives data from the terminal is an uplink direction. In a scenario of communication between a base station 1 and a base station 2, for the base station 1, a direction in which the base station 1 sends data to the base station 2 is a downlink direction, and a direction in which the base station 1 receives data from the base station 2 is an uplink direction. In a scenario of communication between a terminal 1 and a terminal 2, for the terminal 1, a direction in which the terminal 1 sends data to the terminal 2 is a downlink direction, and a direction in which the terminal 1 receives data from the terminal 2 is an uplink direction.

Figure 4:
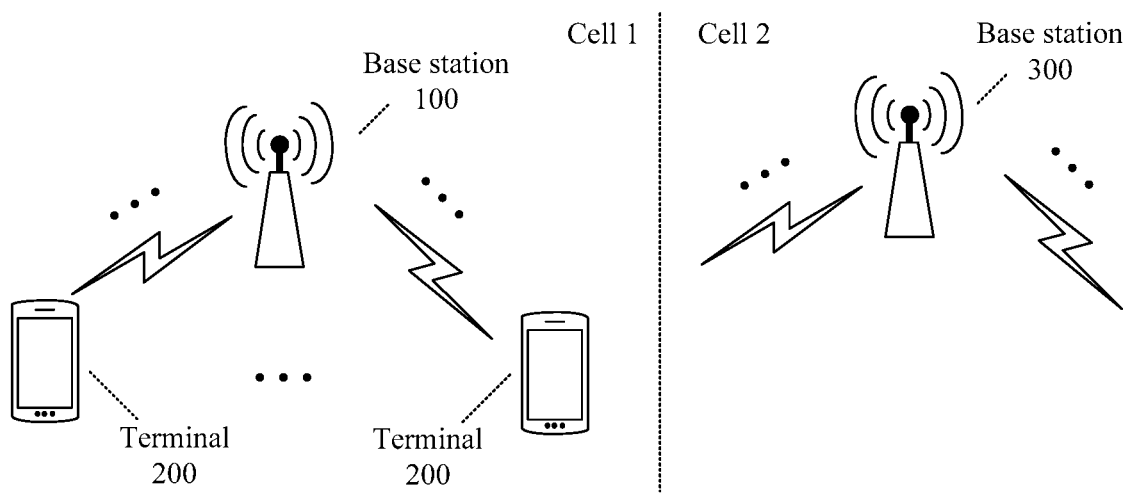
FIG. 4 is a schematic diagram of a network architecture according to an embodiment of this application.

The technical solutions provided in the embodiments of this application may be applied to a system architecture shown in FIG. 4. The system architecture may include a cell 1 and a cell 2. The cell 1 includes a base station 100 and one or more terminals 200 that are connected to the base station 100. The cell 2 includes a base station 300 and the like. The base station 100 and the terminal 200 perform information transmission with each other based on an uplink or downlink transmission direction that is configured for a resource. The base station 100 and the base station 300 may notify each other of transmission directions that are configured for resources, to perform a configuration operation (e.g., resource scheduling) based on a transmission direction configured by the peer for a resource. Herein, the resource includes at least one of a time domain resource, a frequency domain resource, and a code domain resource.

The base station 100 may be a device capable of communicating with the terminal 200 and the base station 300.

The base station 100 or the base station 300 may be a relay station, an access point, or the like. The base station 100 or the base station 300 may be a base transceiver station (BTS) in a Global System for Mobile Communications (GSM) or a Code Division Multiple Access (CDMA) network, or may be an NB (NodeB) in Wideband Code Division Multiple Access (WCDMA), or may be an eNB or eNodeB (evolved NodeB) in LTE. Alternatively, the base station 100 or the base station 300 may be a radio controller in a cloud radio access network (CRAN) scenario. Alternatively, the base station 100 may be a network device in a future 5G network, or a network device in a future evolved public land mobile network (PLMN); or may be a wearable device, an in-vehicle device, or the like. The network device in the future 5G network may include a new radio NodeB, a next generation NodeB (gNB), or a transmission point.

The terminal 200 may be user equipment (UE), an access terminal, a UE unit, a UE station, a mobile station, a mobile station, a remote station, a remote terminal, a mobile device, a UE terminal, a terminal, a wireless communications device, a UE agent, a UE apparatus, or the like. The access terminal may be a cellular phone, a cordless phone, a Session Initiation Protocol (SIP) phone, a wireless local loop (WLL) station, a personal digital assistant (PDA), a hand-held device or a computing device having a wireless communication function, another processing device connected to a wireless modem, an in-vehicle device, a wearable device, a terminal device in a future 5G network, a terminal device in a future evolved PLMN, or the like.

Figure 5:
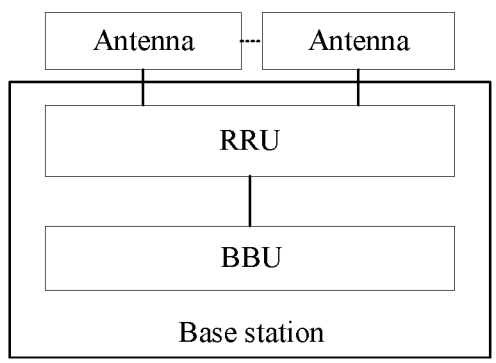
FIG. 5 is a schematic structural diagram of a base station according to an embodiment of this application.

In an example, the base station 100 or the base station 300 may be implemented by using a structure of a base station shown in FIG. 5. As shown in FIG. 5, the base station may include a building baseband unit (BBU) and a remote radio unit (RRU). The RRU is connected to an antenna feeder system (namely, an antenna), and the BBU and the RRU may be split for use based on a requirement. It should be noted that, in a specific implementation process, the base station 100 may further use another universal hardware architecture, and is not limited to the universal hardware architecture shown in FIG. 4.

Figure 6:
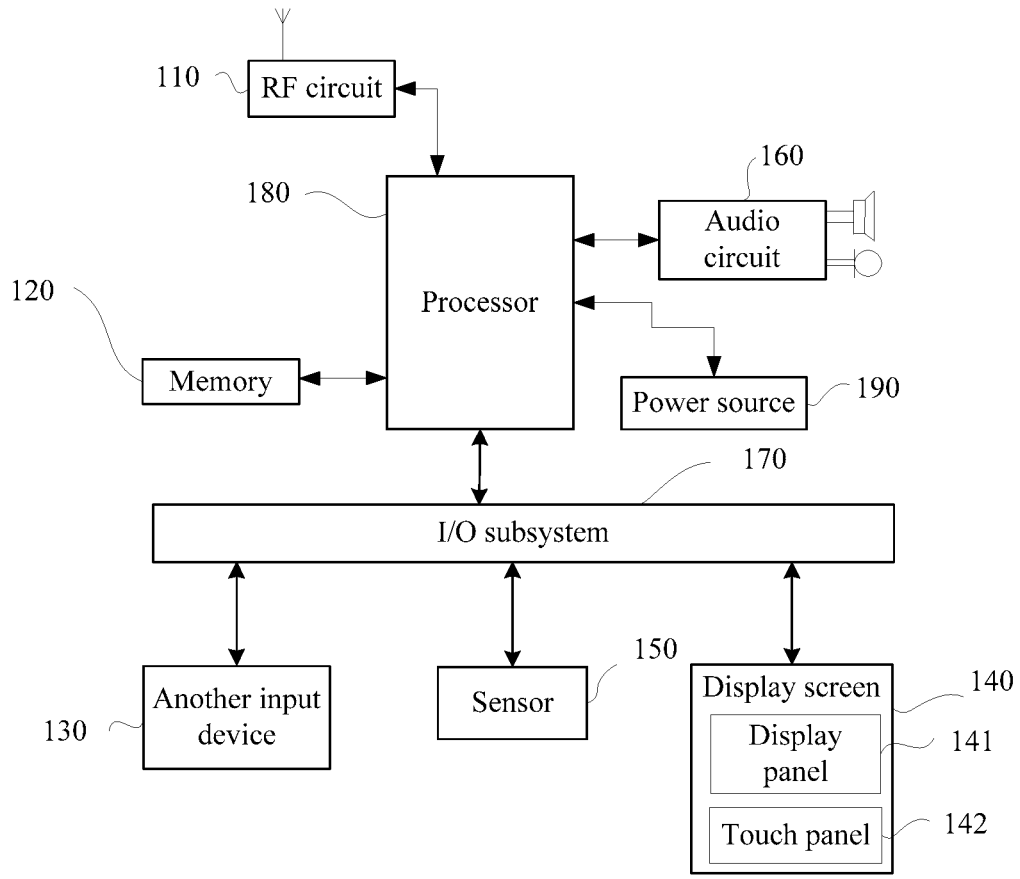
FIG. 6 is a schematic structural diagram of a mobile phone terminal according to an embodiment of this application.

For example, the terminal 200 is a mobile phone. The following describes a universal hardware architecture of the mobile phone. As shown in FIG. 6, the mobile phone may include components, such as a radio frequency (RF) circuit 110, a memory 120, another input device 130, a display screen 140, a sensor 150, an audio circuit 160, an I/O subsystem 170, a processor 180, and a power source 190. Persons skilled in the art may understand that the mobile phone structure shown in FIG. 6 does not constitute a limitation on the mobile phone, and the mobile phone may include more or fewer components than those shown in FIG. 6, or some components may be combined, or some components may be split, or different component arrangements may be used. Persons skilled in the art may understand that the display screen 140 belongs to a user interface (UI), and the display screen 140 may include a display panel 141 and a touch panel 142. In addition, the mobile phone may include more or fewer components than those shown in FIG. 6. Although not shown, the mobile phone may further include functional modules or components such as a camera and a Bluetooth module. Details are not described herein again.

Further, the processor 180 is connected to the RF circuit 110, the memory 120, the audio circuit 160, the I/O subsystem 170, and the power source 190. The I/O subsystem 170 is connected to the another input device 130, the display screen 140, and the sensor 150. The RF circuit 110 may be configured to receive and send a signal during information receiving and sending or in a call process, and particularly, to send, after receiving downlink information from a base station, the downlink information to the processor 180 for processing. The memory 120 may be configured to store a software program and a software module. The processor 180 runs the software program and the software module that are stored in the memory 120, to perform various functional applications of the mobile phone and process data. The another input device 130 may be configured to receive entered numerical or character information, and generate a key signal input related to user settings and function control of the mobile phone. The display screen 140 may be configured to display information entered by a user or information provided for a user and various menus of the mobile phone, and may further accept a user input. The sensor 150 may be an optical sensor, a motion sensor, or another sensor. The audio circuit 160 may provide an audio interface between the user and the mobile phone. The I/O subsystem 170 is an external device for controlling input and output. The external device may include another device input controller, a sensor controller, and a display controller. The processor 180 is a control center of the mobile phone 300, connects each part of the entire mobile phone by using various interfaces and lines, and executes various functions and processes data of the mobile phone 300 by running or executing the software program and/or the software module that are stored in the memory 120 and invoking data stored in the memory 120, so as to perform overall monitoring on the mobile phone. The power source 190 (e.g., a battery) is configured to supply power to each component. Preferably, the power source may be connected to the processor 180 by using a power source management system, so as to implement functions, such as charge management, discharge management, and power consumption management, by using the power source management system.

In the architecture shown in FIG. 4, the base station 100 in the prior art may select one of the seven configuration modes shown in FIG. 1 based on factors such as a service requirement that is collected in a long time, to configure a transmission direction of a resource, and notify the terminal 200 and the base station 300 of the transmission direction configuration in a static or semi-static configuration manner by using high layer signaling. A quantity of the configuration modes shown in FIG. 1 is relatively small, and a resource unit for which a transmission direction can be configured is limited to only a form of a subframe. In this case, configuration of an uplink or downlink transmission direction of a resource is not flexible enough to adapt to a dynamically-changing service requirement. According to the solutions provided in the embodiments of this application, transmission directions of resource elements that are obtained through division based on different resource granularities can be configured. For example, a resource element for which a transmission direction can be configured may be a resource unit smaller than one OFDM symbol, an OFDM symbol, a slot, a mini slot, a subframe, a mini subframe, a radio frame, a super frame, or the like. Correspondingly, there are more configuration modes. In this way, a transmission direction of a resource may be more flexibly configured to adapt to a dynamically-changing service requirement.

Figure 7:
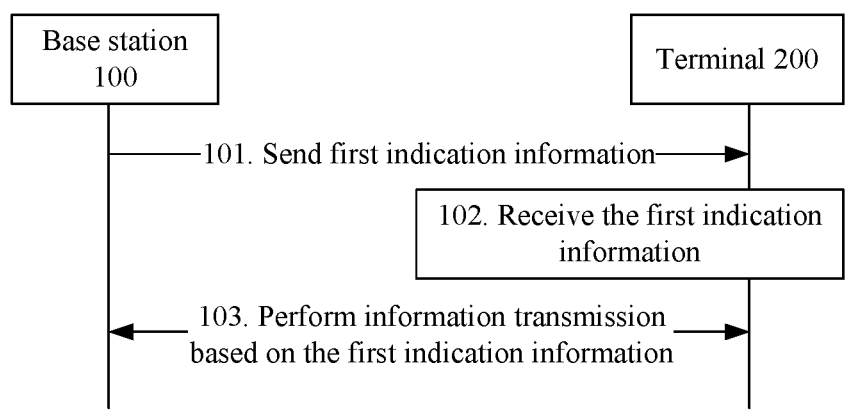
FIG. 7 is a flowchart of a transmission direction configuration method according to an embodiment of this application.

The following describes, with reference to FIG. 7, a transmission direction configuration method provided in an embodiment of this application by using an example in which a first device is the base station 100 in the architecture shown in FIG. 4 and a second device is the terminal 200 in the architecture shown in FIG. 4. The method may include the following steps.

101. The base station 100 sends first indication information to the terminal 200, where the first indication information is used to indicate a configuration of uplink and/or downlink transmission directions, the configuration is used to describe types, a number, and distribution of resource elements included in one period, the resource element is a resource that is obtained through division based on a resource granularity, the resource granularity includes a time domain granularity, the time domain granularity includes a resource unit smaller than one OFDM symbol, an OFDM symbol, a mini slot, a slot, a mini subframe, a subframe, a radio frame, or a super frame, the types of the resource elements include an uplink resource element, a downlink resource element, and a switch resource element between the downlink resource element and the uplink resource element, a transmission direction of the uplink resource element is an uplink direction, and a transmission direction of the downlink resource element is a downlink direction.

That a transmission direction of the uplink resource element is an uplink direction means that information transmission in a corresponding uplink direction from the terminal to the base station may be performed on the uplink resource element. That a transmission direction of the downlink resource element is a downlink direction means that information transmission in a corresponding downlink direction from the base station to the terminal may be performed on the downlink resource element. The switch resource element is located between the downlink resource element and the uplink resource element, and is used for switching between the downlink resource element and the uplink resource element, that is, the switch resource element is a universal guard interval or a gap in a current system. The distribution herein means arrangement of different resource elements in one period.

Herein, the resource element may be a resource unit that is obtained through division based on a resource granularity, where the resource granularity may include a time domain granularity. The time domain granularity may be a resource division unit in time domain. For example, the time domain granularity may include a resource unit smaller than one OFDM symbol, an OFDM symbol, a slot, a mini slot, a subframe, a mini subframe, a radio frame, a super frame, or the like. In time domain, correspondingly, the resource element that is obtained through division is also presented as a resource unit smaller than one OFDM symbol, an OFDM symbol, a slot, a mini slot, a subframe, a mini subframe, a radio frame, a super frame, or the like. Compared with the prior art in which resource elements in one period include only subframes, in this embodiment of this application, a resource element in one period may be a resource unit smaller than one OFDM symbol, an OFDM symbol, a slot, a mini slot, a subframe, a mini subframe, a radio frame, a super frame, or the like that is obtained through division based on the time domain granularity.

In this way, division of the resource units may not be limited to a form of a subframe as in the prior art, and a smaller or larger resource element may be obtained through division, so that resource division is more flexible. When the uplink and/or downlink transmission directions are configured based on the resource elements that are in various forms and different in size, a transmission direction of a resource may be more flexibly configured.

In addition, compared with a prior-art configuration mode in which one period includes 10 subframes, in this embodiment of this application, a number of resource elements included in one period is not limited, and more types of resource elements may be included. Different types and different quantities of resource elements may correspond to more distribution manners. In other words, there are more configuration modes. In this way, an uplink or downlink transmission direction of a resource element is more flexibly configured.

In this embodiment of this application, different configurations, indicated by the first indication information, of uplink and/or downlink transmission directions in one period may be referred to as different configuration modes.

For example, assuming that a form of a resource element in a configured period is a slot, and each period is 5 ms including 10 slots, possible configuration modes may be shown in Table 1 below. In Table 1, U represents an uplink slot, D represents a downlink slot, and S represents a special slot, where the special slot is used for switching between a downlink transmission direction and an uplink transmission direction.

TABLE 1

| Mode | Slot number | | | | | | | | | |
| --- | --- | --- | --- | --- | --- | --- | --- | --- | --- | --- |
| number | 0 | 1 | 2 | 3 | 4 | 5 | 6 | 7 | 8 | 9 |
| #0 | d | s | u | d | d | s | u | d | s | u |
| #1 | d | d | s | u | d | d | s | u | u | d |
| #2 | u | u | d | d | d | d | d | s | u | u |
| #3 | d | d | d | d | s | u | d | s | u | d |
| ... | ... | ... | ... | ... | ... | ... | ... | ... | ... | ... |

For another example, assuming that forms of resource elements in a configured period include a slot and a subframe, and each period is 5 ms including 2 subframes and 6 slots, possible configuration modes may be shown in Table 2 below. In Table 2, U represents an uplink subframe, D represents a downlink subframe, u represents an uplink slot, d represents a downlink slot, S represents a special subframe, and s represents a special slot, where the special subframe and the special slot are used for switching between a downlink transmission direction and an uplink transmission direction.

TABLE 2

| Mode | Resource element number | | | | | | | |
| --- | --- | --- | --- | --- | --- | --- | --- | --- |
| | Subframe | | Slot | | | | | |
| number | 0 | 1 | 0 | 1 | 2 | 3 | 4 | 5 |
| #0 | D | S | u | d | d | s | u | d |
| #1 | D | D | s | u | d | d | s | u |
| #2 | U | U | d | d | d | s | u | u |
| #3 | D | D | d | d | s | u | u | u |
| ... | ... | ... | ... | ... | ... | ... | ... | ... |

It needs to be noted that, in this embodiment of this application, a size of a period may be configured depending on an actual situation, for example, may be 2 ms, 5 ms, 10 ms, or the like. The base station 100 may notify the terminal 200 of the configured period by using any one of high layer signaling, Media Access Control MAC layer signaling, or physical layer signaling. In addition, resource elements included in a period may be in one or more of forms, such as a resource unit smaller than one OFDM symbol, an OFDM symbol, a mini slot, a slot, a mini subframe, a subframe, a radio frame, and a super frame; and a specific quantity and a distribution manner of the resource elements may be combined based on an actual requirement, but are not limited to situations shown in Table 1 or Table 2, and are not enumerated herein.

102. The terminal 200 receives the first indication information sent by the base station 100.

After receiving the first indication information sent by the base station 100, the terminal 200 may learn, based on the first indication information, an uplink or downlink transmission direction configured for a resource element.

103. The base station 100 performs information transmission based on the configuration, indicated by the first indication information, of the uplink and/or downlink transmission directions.

After sending the first indication information, the base station 100 may perform information transmission with the terminal 200 in the cell 1 based on the uplink and/or downlink transmission directions, indicated by the first indication information, of the resource elements.

104. The terminal 200 performs information transmission based on the configuration, indicated by the first indication information, of the uplink and/or downlink transmission directions.

After receiving the first indication information sent by the base station 100, the terminal 200 may perform information transmission with the base station 100 based on the uplink and/or downlink transmission directions, indicated by the first indication information, of the resource elements.

In addition, when the second device in step 102 is the base station 300, in step 104, after receiving the first indication information sent by the base station 100, the base station 300 may perform a configuration operation based on the transmission directions, indicated by the first indication information, of the resource elements, for example, may update or re-configure a configuration mode of the cell 2 or perform scheduling limitation, to reduce interference with the cell 1.

It can be learned that in the configuration method provided in this embodiment of this application, the base station 100 may divide a resource into various forms of resource elements based on different resource granularities, so that uplink and/or downlink transmission directions may be configured based on different forms, different quantities, and different distribution manners of the resource elements. In this way, a configuration manner becomes more flexible, to better adapt to a dynamically-changing service requirement.

Further, in this embodiment of this application, the base station 100 may pre-configure a specific numerical value of the foregoing period. Before step 101, the configuration method may further include: sending, by the base station 100, the period to the terminal 200 by using at least one of high layer signaling, MAC layer signaling, or physical layer signaling.

The sending, by the base station 100, the period to the terminal 200 by using high layer signaling may specifically include: sending, by the base station 100, the period to the terminal 200 by using system information.

In this embodiment of this application, because the base station 100 may configure a specific period value and a transmission direction of a resource element, the base station 100 may control performance of a link between the base station 100 and the terminal 200, so that the link performance is controllable.

In addition, in this embodiment of this application, when the time domain granularity is a subframe, the uplink resource element includes at least one of a first uplink subframe and a second uplink subframe, and the downlink resource element includes at least one of a first downlink subframe and a second downlink subframe. The first uplink subframe is a normal uplink subframe, the first downlink subframe is a normal downlink subframe, the second uplink subframe includes transmission on a downlink control channel, an uplink data channel, and an uplink control channel, and the second downlink subframe includes transmission on a downlink control channel, a downlink data channel, and an uplink control channel.

The first uplink subframe is a normal uplink subframe, the first downlink subframe is a normal downlink subframe, the second uplink subframe includes transmission on a downlink control channel, an uplink data channel, and an uplink control channel, and the second downlink subframe includes transmission on a downlink control channel, a downlink data channel, and an uplink control channel. The first uplink subframe and the first downlink subframe are normal subframes in a currently common sense. For details, refer to the descriptions about subframes at the beginning of DESCRIPTION OF EMBODIMENTS. The second uplink subframe and the second downlink subframe may be a new-type uplink subframe and a new-type downlink subframe respectively, and may be referred to as a self-contained uplink subframe and a self-contained downlink subframe respectively. For details, refer to the related descriptions about FIG. 2a and FIG. 2b. The second uplink subframe and the second downlink subframe may also be referred to as a mixed uplink subframe and a mixed downlink subframe respectively. In addition, when the time domain granularity is a subframe, subframes in the period may further include a new-type special subframe. For details, refer to parts each filled with vertical lines in FIG. 2a and FIG. 2b. The new-type special subframe may be used for switching between a downlink transmission direction and an uplink transmission direction. In other words, the new-type special subframe is used for switching between the new-type downlink subframe and the new-type uplink subframe. The second uplink subframe and the second downlink subframe may include an uplink/downlink switch interval, which is also referred to as a guard interval.

When the time domain granularity is a slot, the uplink resource element includes at least one of a first uplink slot and a second uplink slot, and the downlink resource element includes at least one of a first downlink slot and a second downlink slot. The first uplink slot is a normal uplink slot, the first downlink slot is a normal downlink slot, the second uplink slot includes transmission on a downlink control channel, an uplink data channel, and an uplink control channel, and the second downlink slot includes transmission on a downlink control channel, a downlink data channel, and an uplink control channel.

The first uplink slot is a normal uplink slot, the first downlink slot is a normal downlink slot, the second uplink slot includes transmission on a downlink control channel, an uplink data channel, and an uplink control channel, and the second downlink slot includes transmission on a downlink control channel, a downlink data channel, and an uplink control channel. The first uplink slot and the first downlink slot are normal slots in a currently common sense. For details, refer to the descriptions about slots at the beginning of DESCRIPTION OF EMBODIMENTS. The second uplink slot and the second downlink slot may be a new-type uplink slot and a new-type downlink slot respectively, and may be referred to as a self-contained uplink slot and a self-contained downlink slot respectively. For details, refer to the related descriptions about FIG. 2a and FIG. 2b. The second uplink slot and the second downlink slot may also be referred to as a mixed uplink slot and a mixed downlink slot respectively. In addition, when the time domain granularity is a slot, slots in the period may further include a new-type special slot. For details, refer to parts each filled with vertical lines in FIG. 2a and FIG. 2b. The new-type special slot may be used for switching between a downlink transmission direction and an uplink transmission direction. In other words, the new-type special slot is used for switching between the new-type downlink slot and the new-type uplink slot. The second uplink slot and the second downlink slot may include an uplink/downlink switch interval, which is also referred to as a guard interval.

In this way, compared with a prior-art configuration mode in which subframes in one period include a normal downlink subframe, a normal uplink subframe, and a special subframe, in a configuration mode in this embodiment of this application, resource elements in one period may be in a plurality of forms. When the resource elements in the period are subframes or slots, the subframes or slots herein may further include a self-contained uplink subframe or slot and a self-contained downlink subframe or slot, in addition to the normal downlink subframe or slot, the normal uplink subframe or slot, and special subframes or slots. In addition, these subframes or slots may correspond to different distribution situations or different structures in different configurations, so that more configuration modes can be obtained in this embodiment of this application, to more flexibly configure a transmission direction of a resource.

For example, assuming that a form of a resource element in a configured period is a subframe, and each period includes 10 ms totaling 10 subframes, possible configuration modes may be shown in Table 3 below. In Table 3, U represents a normal uplink subframe, D represents a normal downlink subframe, NU represents a new-type uplink subframe, ND represents a new-type downlink subframe, and S represents a new-type special subframe, where the new-type special subframe is used for switching between a downlink transmission direction and an uplink transmission direction.

TABLE 3

| Mode | Subframe number | | | | | | | | | |
|---|---|---|---|---|---|---|---|---|---|---|
| number | 0 | 1 | 2 | 3 | 4 | 5 | 6 | 7 | 8 | 9 |
| #0 | D | S | U | ND | ND | S | NU | ND | S | NU |
| #1 | ND | D | S | NU | D | D | S | U | NU | U |
| #2 | NU | NU | D | S | U | ND | D | S | U | NU |
| #3 | U | D | D | ND | S | NU | ND | S | U | ND |
| ... | ... | ... | ... | ... | ... | ... | ... | ... | ... | ... |

For example, assuming that a form of a resource element in a configured period is a slot, and each period includes 5 ms totaling 10 slots, possible configuration modes may be shown in Table 4 below. In Table 4, nu represents a new-type uplink slot, nd represents a new-type downlink slot, and ns represents a new-type special slot, where the new-type special slot is used for switching between a downlink transmission direction and an uplink transmission direction.

TABLE 4

| Mode | Slot number | | | | | | | | | |
|---|---|---|---|---|---|---|---|---|---|---|
| number | 0 | 1 | 2 | 3 | 4 | 5 | 6 | 7 | 8 | 9 |
| #0 | d | s | u | nd | nd | s | u | nd | ns | nu |
| #1 | d | d | s | nu | nd | d | s | nu | u | nd |
| #2 | u | u | d | nd | nd | d | d | s | u | u |
| #3 | d | d | d | nd | ns | nu | d | s | u | d |
| ... | ... | ... | ... | ... | ... | ... | ... | ... | ... | ... |

For another example, assuming that forms of resource elements in a configured period include a slot and a subframe, and each period is 5 ms including 2 subframes and 6 slots, possible configuration modes may be shown in Table 5 below. In Table 5, U represents a normal uplink subframe, D represents a normal downlink subframe, u represents a normal uplink slot, d represents a normal downlink slot, S represents a special subframe, and s represents a special slot, where the special subframe and the special slot are used for switching between a downlink transmission direction and an uplink transmission direction; and NU represents a new-type uplink subframe, ND represents a new-type downlink subframe, NS represents a new-type special subframe, nu represents a new-type uplink slot, nd represents a new-type downlink slot, and ns represents a new-type special slot, where the new-type special subframe and the new-type special slot are used for switching between a new-type downlink transmission direction and a new-type uplink transmission direction.

TABLE 5

| Mode | Resource element number | | | | | | | |
|---|---|---|---|---|---|---|---|---|
| | Subframe | | Slot | | | | | |
| number | 0 | 1 | 0 | 1 | 2 | 3 | 4 | 5 |
| #0 | ND | NS | nu | nd | nd | s | u | d |
| #1 | ND | ND | ns | nu | d | d | s | u |
| #2 | NU | NU | nd | nd | d | s | u | u |
| #3 | ND | ND | nd | nd | s | u | u | u |
| ... | ... | ... | ... | ... | ... | ... | ... | ... |

In addition, in a frequency division duplex (FDD) system, an uplink or downlink transmission direction of a time domain resource in an entire frequency band of an uplink or downlink carrier or in some sub-bands of the uplink or downlink carrier can change based on a service requirement, so that the uplink carrier or downlink carrier does not only maintain sustained as an uplink or downlink carrier. Therefore, in this embodiment of this application, the resource granularity may further include a frequency domain granularity in addition to the time domain granularity. In other words, the resource elements may be more flexibly and finely divided in two dimensions, namely, the time domain granularity and the frequency domain granularity, so that an uplink or downlink transmission direction is more flexibly configured based on a resource element.

The frequency domain granularity may be a resource division unit in frequency domain, for example, may include a physical resource block PRB, a control channel element CCE, a sub-band, a frequency band, or the like. A resource that is obtained through division based on the frequency domain granularity is also presented as a PRB, a CCE, a sub-band, or a frequency band in frequency domain. The frequency band herein may be a carrier frequency band. For example, when the time domain granularity is a slot, and the frequency domain granularity is a PRB, a resource element that is obtained through division may be a resource unit shown in FIG. 3.

In an optional implementation, that the configuration is used to describe types, a number, and distribution of resource elements included in one period in step 101 includes: the configuration is used to describe types, a number, and distribution of resource elements included in a current period or in a k period after a current period, where k is a positive integer. In other words, the base station 100 may configure a configuration mode corresponding to a current period or a next period.

Figure 8A:
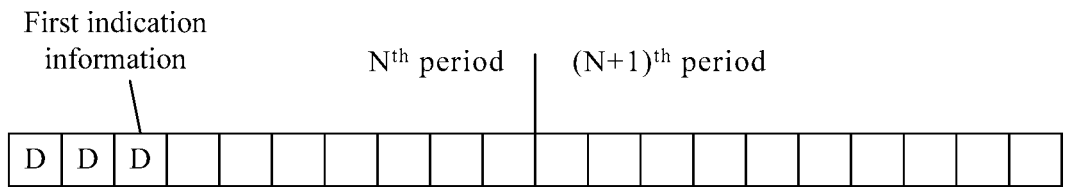
FIG. 8a is a schematic diagram of a position of first indication information according to an embodiment of this application.
Figure 8B:
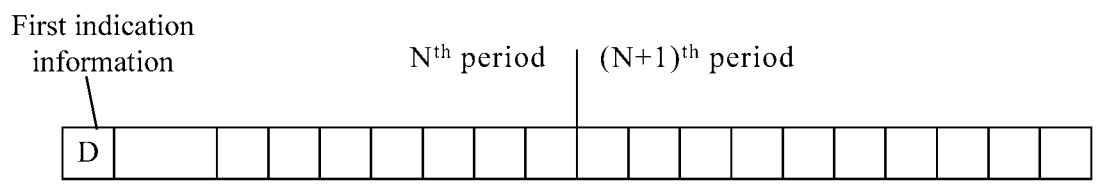
FIG. 8b is a schematic diagram of another position of first indication information according to an embodiment of this application.

For example, in a possible situation, as shown in FIG. 8a, first indication information located in the $3^{rd}$ downlink subframe in an $N^{th}$ period may be used to indicate a configuration mode corresponding to an $(N+1)^{th}$ period. In another possible situation, as shown in FIG. 8b, first indication information located in the $1^{st}$ downlink subframe in an $N^{th}$ period may be used to indicate a configuration mode corresponding to a current $N^{th}$ period. It needs to be noted that, whether the first indication information is used to indicate a configuration mode corresponding to a current period, a configuration mode corresponding to a next period, or a configuration mode corresponding to a subsequent $x^{th}$ period may be related to a position of the first indication information in the current period, or may be notified in advance by using high layer signaling, and this is not specifically limited herein. D represents a downlink subframe.

In this embodiment of this application, the base station 100 may configure a configuration mode corresponding to a current or a next period, to indicate, to the terminal 200 in real time when a related service changes, uplink and/or downlink transmission directions of resource elements corresponding to the current period, the next period, or the subsequent $x^{th}$ period, so as to perform information transmission in the current period or the next period based on a newly configured uplink or downlink transmission direction, thereby responding to a dynamically-changing service requirement in a timely manner. In the prior art, the base station 100 selects a configuration mode based on factors such as a service requirement that is collected in a long time. Generally, the selected configuration mode is stable in a long time and does not change within a short run, and cannot change in real time at all. Therefore, when a service requirement in a network fluctuates relatively greatly, the configuration manner in the prior art cannot satisfy a dynamically-changing service requirement.

In addition, when the resource element includes the new-type subframe or the new-type slot, because the new-type subframe or the new-type slot includes data information and control information, a problem of interference between cells deserves more consideration. For example, when a subframe currently processed by the base station 100 is a normal downlink subframe, and a subframe currently processed by the base station 300 is a new-type uplink subframe, whether link interference between different link directions or cross link interference (CLI) exists in a data information part needs to be considered, and interference in a control information part also needs to be considered. For example, an uplink control information part of the base station 300 is interfered by downlink data transmission of the base station 100. Therefore, enhancement of dynamic allocation of uplink and/or downlink transmission directions by the base station 300 needs to be considered. According to the configuration method provided in this embodiment of this application, uplink and/or downlink transmission directions may be flexibly configured in real time to reduce mutual interference between cells. According to the configuration method in the prior art, however, interference between different link directions cannot be resolved.

It needs to be noted that, in this embodiment of this application, the first indication information may directly indicate uplink and/or downlink transmission directions of resource elements in one period. For example, the first indication information may be content in Table 1, to indicate the transmission directions of the resource elements. Alternatively, the first indication information may include identification information, and the identification information is used to indicate the configuration of the uplink and/or downlink transmission directions. When the first indication information includes the identification information, initial configuration information may be preset. The initial configuration information may include a correspondence between the configuration of the uplink and/or downlink transmission directions and the identification information. The initial configuration information may also be referred to as corresponding information of the configuration of the uplink and/or downlink transmission directions.

A specific representation form of the first indication information is not limited in this embodiment of this application. In an optional implementation, the identification information may be an index. In this embodiment of this application, description is made by using an example in which a configuration mode is used as a representation form of the configuration of the uplink and/or downlink transmission directions.

Figure 9:
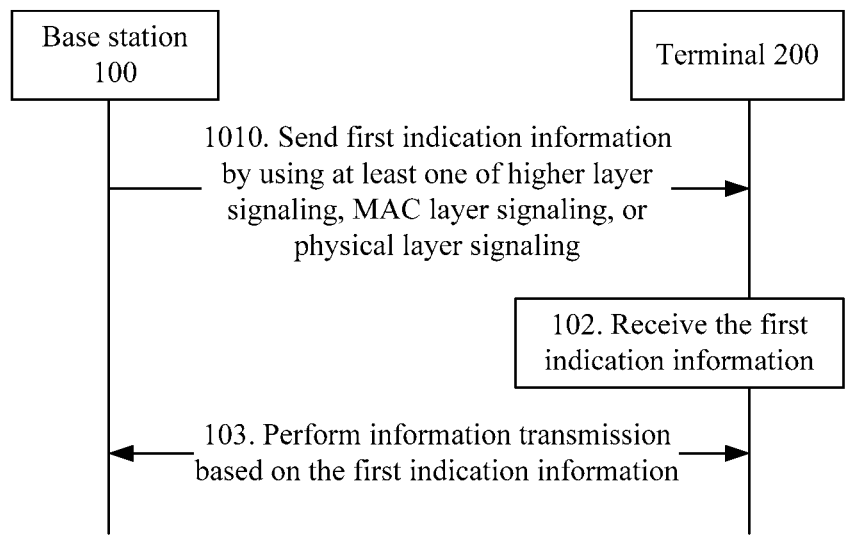
FIG. 9 is another flowchart of a transmission direction configuration method according to an embodiment of this application.

In step 101, referring to FIG. 9, the sending, by the base station 100, first indication information to the terminal 200 may specifically include the following step.

1010. The base station 100 sends the first indication information to the terminal 200 by using at least one of high layer signaling, Media Access Control MAC layer signaling, or physical layer signaling.

In other words, regardless of whether the first indication information is information directly indicating the uplink and/or downlink transmission directions of the resource elements or information including the identification information, the first indication information may be sent to the terminal 200 by using at least one of the high layer signaling, the MAC layer signaling, or the physical layer signaling.

Figure 10:
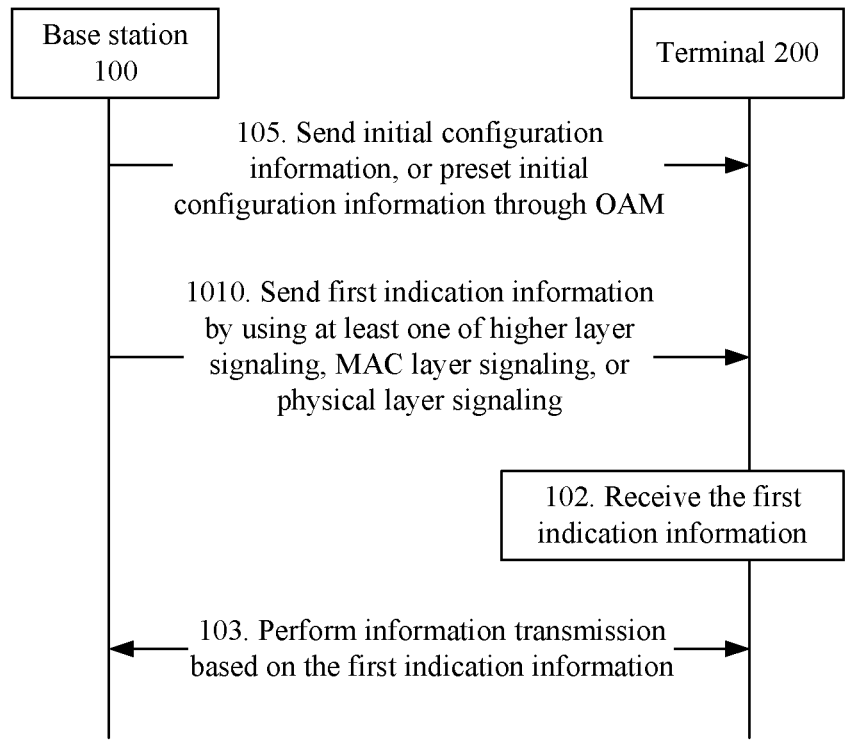
FIG. 10 is still another flowchart of a transmission direction configuration method according to an embodiment of this application.

Specifically, referring to FIG. 10, when the first indication information includes the identification information, before step 101, the method may further include the following step.

105. The base station 100 sends initial configuration information to the terminal 200, or configures initial configuration information in advance by using an operation, administration, and maintenance OAM center, where the initial configuration information includes a correspondence between the identification information and the configuration of the uplink and/or downlink transmission directions.

Before sending the first indication information, the base station 100 may notify, in advance, the terminal 200 of the initial configuration information including the correspondence between the first indication information and the configuration of the uplink and/or downlink transmission directions, namely, a configuration mode, or preset the initial configuration information through OAM. In this way, after the first indication information is sent, the terminal 200 may learn a configuration mode of a current configuration of the base station 100 based on the correspondence, obtained in advance, between the first indication information and the configuration mode.

In addition, compared with the first indication information, an amount of the initial configuration information is relatively large, and the initial configuration information may further include some other information based on an actual requirement, to explain a meaning of the first indication information, so that the terminal 200 may clearly learn, based on the first indication information, a configuration mode indicated by the base station 100. The initial configuration information may be sent to the terminal 200 in a semi-static configuration manner. In this embodiment of this application, the semi-static configuration may be notified by using high layer signaling. For example, the high layer signaling may be radio resource control (RRC) signaling, or the high layer signaling is sent by using broadcast information. Specifically, the base station 100 may notify the base station 300 of the initial configuration information by using an interface between the base stations, or may notify the terminal 200 of the initial configuration by using air interface signaling.

For clearer description, the following makes a description by using examples.

It is assumed that a configured period in the prior art is 10 ms. According to an LTE design, a default configuration mode is subframes DSUUU DSUUU. Through a default configuration, the terminal considers, based on system information, that a current configuration mode is a configuration mode #0 shown in FIG. 1, where D is a normal downlink subframe, S is a special subframe, and U is a normal uplink subframe.

In this embodiment of this application, to support a more flexible configuration of uplink and/or downlink transmission directions, a processing manner may be: processing first three subframes in each 5 ms as fixed subframes, and processing last two subframes as flexible subframes. In other words, subframes are DSUFF DSUFF. For example, in this case, four bits may be used to indicate a type of the flexible subframes. For details, refer to Table 6 below. In Table 6, U represents a normal uplink subframe, D represents a normal downlink subframe, S represents a special subframe, NU represents a new-type uplink subframe, and ND represents a new-type downlink subframe.

TABLE 6

| Indication bits | Subframe number | | | | | | | | | |
|---|---|---|---|---|---|---|---|---|---|---|
| | 0 | 1 | 2 | 3 | 4 | 5 | 6 | 7 | 8 | 9 |
| 0000 | D | S | U | NU | NU | D | S | U | NU | U |
| 0001 | D | S | U | NU | NU | D | S | U | NU | D |
| 0010 | D | S | U | NU | NU | D | S | U | ND | ND |
| 0011 | D | S | U | NU | ND | D | S | U | NU | NU |
| 0100 | D | S | U | NU | ND | D | S | U | NU | ND |
| 0101 | D | S | U | NU | ND | D | S | U | ND | ND |
| 0110 | D | S | U | ND | ND | D | S | U | NU | NU |
| 0111 | D | S | U | ND | ND | D | S | U | NU | ND |
| 1000 | D | S | U | ND | ND | D | S | U | ND | ND |

In each row of Table 6, four indication bits may correspond to one configuration mode. In the example, the first indication information may include the identification information, which may be, for example, the four bits shown in Table 6, and the initial configuration information may include content in Table 6. When the base station 100 sends the four indication bits as the first indication information to the terminal 200, the terminal 200 may determine the configuration mode based on the four indication bits and the content in Table 6.

It needs to be noted that in Table 6, the flexible subframe may further be a self-contained uplink subframe NU or a self-contained downlink subframe ND. The terminal 200 may measure a channel and feed back a channel quality indicator (CQI) or a channel state indicator (CSI) in the flexible subframe, so that the base station 100 performs scheduling based on the fed back CQI or CSI. In addition, before detecting the flexible subframe, the terminal 200 has learned a transmission direction of the flexible subframe in advance, so that the terminal 200 may stop PDCCH detection in the flexible subframe that is set to an uplink subframe, thereby reducing power consumption of the terminal 200.

Figure 11A:
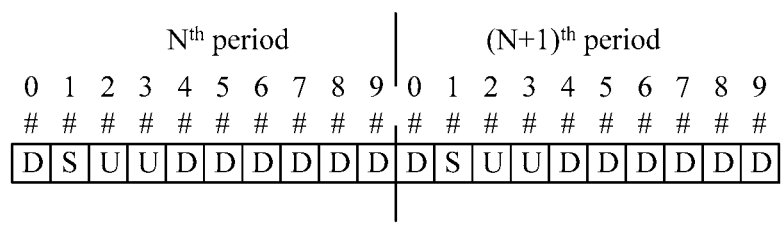
FIG. 11a is a schematic diagram of a configuration of uplink and/or downlink transmission directions according to an embodiment of this application.
Figure 11B:
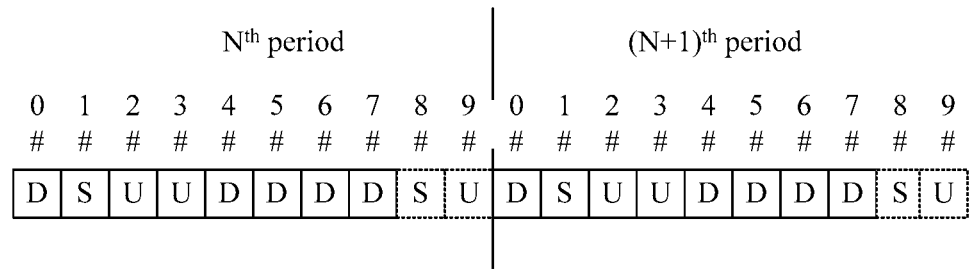
FIG. 11b is a schematic diagram of another configuration of uplink and/or downlink transmission directions according to an embodiment of this application.

In addition, the configuration method provided in this embodiment of this application further helps reduce a delay of feeding back a hybrid automatic repeat request (HARQ) by the terminal 200. When a configuration mode 4 # shown in FIG. 1 in the prior art is used, if the terminal 200 receives, in a subframe 4 # in an $N^{th}$ period shown in FIG. 11a, data sent by the base station 100, the terminal 200 can send a HARQ feedback only in an uplink subframe 2 # in an $(N+1)^{th}$ period. In the configuration method provided in this embodiment of this application, the terminal 200 may learn, in advance in an $N^{th}$ period shown in FIG. 11b or in a period before an $N^{th}$ period based on the first indication information, a configuration mode corresponding to the $N^{th}$ period. Therefore, when an uplink subframe A further exists after an uplink subframe 4 # in the $N^{th}$ period, the terminal 200 may send a HARQ feedback in the uplink subframe A, instead of sending the HARQ feedback in an uplink subframe 2 # in an $(N+1)^{th}$ period as in the prior art, thereby reducing a HARQ feedback delay.

Figure 12:
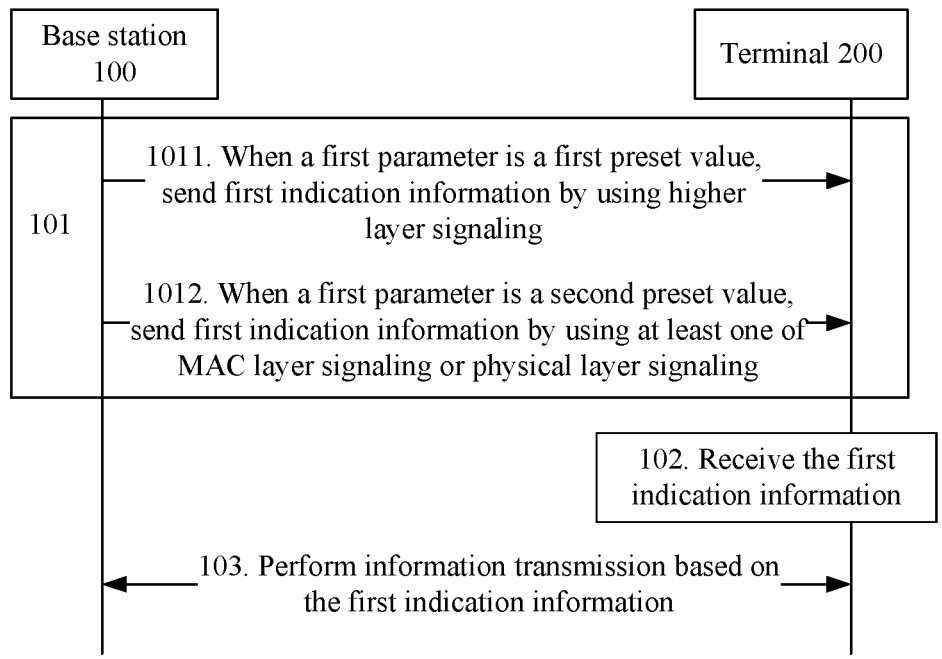
FIG. 12 is yet another flowchart of a transmission direction configuration method according to an embodiment of this application.

Further, referring to FIG. 12, the base station 100 may be configured with a first parameter. When the first parameter is a first preset value, step 101 may specifically include the following step.

1011. The base station 100 sends the first indication information to the terminal 200 by using the high layer signaling.

In this way, the base station 100 sends the first indication information to the terminal 200 in a semi-static configuration manner by using the high layer signaling.

When the first parameter is a second preset value, step 101 may specifically include the following step.

1012. The base station 100 sends the first indication information to the terminal 200 by using the at least one of the MAC layer signaling or the physical layer signaling.

In this way, the base station 100 may send the first parameter to the second device by using at least one of high layer signaling, MAC layer signaling, or physical layer signaling. In this way, the base station 100 may send the first parameter to the terminal 200 in a semi-static configuration manner by using high layer signaling, or send the first parameter to the terminal 200 in a dynamic configuration manner by using MAC layer signaling or physical layer signaling. The sending, by the base station 100, the first parameter to the terminal 200 by using high layer signaling may include: sending, by the base station 100, the first parameter to the terminal 200 by using system information. In this way, the base station 100 may notify the terminal 200 of the first parameter by using the system information.

In an example, the first parameter may be a period. In other words, when the period is set to the second preset value, the dynamic configuration manner may be activated, and the terminal 200 needs to detect MAC layer signaling or physical layer signaling to learn a configuration of a transmission direction. On the contrary, when the period is set to the first preset value, the dynamic configuration manner may be deactivated, and the terminal 200 needs to detect high layer signaling to learn a configuration of a transmission direction. For example, one bit is used to represent the first parameter, the first preset value is 0, and the second preset value is 1. When the first parameter is 0, the base station 100 sends the first indication information to the terminal 200 by using high layer signaling. When the first parameter is 1, the base station 100 sends the first indication information to the terminal 200 by using at least one of MAC layer signaling or physical layer signaling. For example, if two bits are used to represent the first parameter, the first preset value may be any one of 01, 10, and 11, where 01, 10, and 11 may correspond to different period values respectively. For example, 01 represents 5 ms, 10 represents 10 ms, and 11 represents 20 ms. The second preset value is 00. When the first parameter is 10, the base station 100 sends the first indication information to the terminal 200 by using high layer signaling, with a period of 10 ms. When the first parameter is 00, the base station 100 sends the first indication information to the terminal 200 by using at least one of MAC layer signaling or physical layer signaling. When the dynamic configuration manner is used, a corresponding period value may be 1 ms, 2 ms, 3 ms, or the like. When the semi-static configuration manner is used, a corresponding period value may be 5 ms, 10 ms, 20 ms, 50 ms, 100 ms, or the like. The period may be configured by using at least one of high layer signaling, MAC layer signaling, or physical layer signaling. When configuration is performed by using high layer signaling, the period may be notified by using system information.

It can be learned according to step 1011 and step 1012 that, the base station 100 may set the first parameter to the first preset value or the second preset value, to determine whether to send the first indication information by using the semi-static configuration manner or the dynamic configuration manner, so as to configure the uplink and/or downlink transmission directions of the resource elements. In addition, through switching between the first preset value and the second preset value, flexible switching between the semi-static configuration manner and the dynamic configuration manner can be implemented or the dynamic configuration manner can be activated/deactivated. In this way, an uplink or downlink transmission direction of a resource element is more flexibly configured.

In the prior art, the base station sends indication information of uplink and/or downlink transmission directions by using high layer signaling. Compared with the use of high layer signaling, in this embodiment of this application, physical layer signaling or MAC layer signaling may be used to reduce a processing delay, with no need to predict a service characteristic, so that the base station 100 can efficiently adjust an uplink or downlink transmission direction of a resource element, to adapt to the service characteristic.

In this way, when a service in a cell fluctuates relatively greatly, the base station 100 may activate the dynamic configuration manner, to respond to a dynamic service in real time. When a service in a cell fluctuates relatively slightly, the base station 100 may configure uplink and/or downlink transmission directions in the semi-static configuration manner, and deactivate the dynamic configuration manner, so as to reduce costs of detecting a control channel by the terminal 200, and reduce device power consumption.

In addition, in this embodiment of this application, the base station 100 notifies the terminal 200 of the large amount of initial configuration information in the semi-static configuration manner by using high layer signaling in advance, or pre-configures the initial configuration information through OAM and sends a relatively small amount of simple first indication information to the terminal 200 in the dynamic configuration manner by using physical layer signaling or MAC layer signaling. In this way, load borne on a link can be reduced, a delay of configuration of uplink and/or downlink transmission directions can be reduced, configuration efficiency of the base station 100 can be improved, dynamic allocation of uplink and/or downlink transmission directions can be enhanced, and mutual interference between cells can be reduced.

In another possible implementation, the first indication information may carry a second parameter. The second parameter may be used to indicate a time duration, and the time duration may include M periods, where M is a positive integer. That the configuration is used to describe types, a number, and distribution of resource elements included in one period may include: the configuration may be used to describe types, a number, and distribution of resource elements included in each of the M periods included in the time duration indicated by the second parameter.

The second parameter and the period may be the same as or may be different from each other, and the time duration indicated by the second parameter may include at least one period. For example, when the period is 5 ms, and the second parameter represents 20 ms, 20 ms represented by the second parameter includes four periods, and the first indication information may be used to indicate types, a number, and distribution of resource elements included in each of the four periods. In other words, configurations of uplink and/or downlink transmission directions in the four periods are the same.

In another possible implementation, the first indication information may carry a third parameter, and the third parameter may be used to indicate a time point. That the configuration is used to describe types, a number, and distribution of resource elements included in one period includes: the configuration is used to describe types, a number, and distribution of resource elements included in each period in a time domain after the time point indicated by the third parameter.

The third parameter may be a joint representation of one or more of a start resource unit smaller than one OFDM symbol, an OFDM symbol, a slot, a mini slot, a subframe, a mini subframe, a radio frame or, a super frame.

For example, when the period is 5 ms and the third parameter represents a time point 1, a plurality of periods may be included after the time point 1, and the first indication information may be used to indicate types, a number, and distribution of resource elements included in each period after the time point 1. In other words, a configuration of uplink and/or downlink transmission directions in each period after the time point 1 is the same.

In another possible implementation, the first indication information may carry a second parameter and a third parameter. The second parameter is used to indicate a time duration, and the third parameter is used to indicate a time point. That the configuration is used to describe types, a number, and distribution of resource elements included in one period includes: the configuration is used to describe types, a number, and distribution of resource elements included in each period in the time duration indicated by the second parameter.

For example, when the period is 5 ms, the second parameter represents 20 ms, and the third parameter represents a time point 1, 20 ms indicated by the second parameter includes four periods, and the first indication information may be used to indicate types, a number, and distribution of resource elements included in each of the four periods after the time point 1. In other words, configurations of uplink and/or downlink transmission directions in four periods included in a 20 ms time window after the time point 1 are the same.

In another possible implementation, the base station 100 may be further configured with a second parameter, and the second parameter is used to indicate a time duration. The method may further include the following step:

106. The base station 100 sends second indication information to the terminal 200 by using at least one of high layer signaling, MAC layer signaling, or physical layer signaling, where the second indication information carries a second parameter, and the second indication information is used to indicate that a configuration of uplink and/or downlink transmission directions in each period in the time duration indicated by the second parameter is the configuration indicated by the first indication information.

In this way, the base station 100 may send the second indication information to the terminal 200 in the semi-static configuration manner or the dynamic configuration manner, to indicate that a configuration of uplink and/or downlink transmission directions in each period included in the time duration indicated by the second parameter is the configuration indicated by the first indication information. When receiving the second indication information that carries the second parameter, the terminal 200 may learn that a configuration of uplink and/or downlink transmission directions in each period included in the time duration indicated by the second parameter is the configuration indicated by the first indication information. The second parameter and the period may be the same as or may be different from each other.

For example, when the second parameter is 20 ms and the period is 5 ms, the second indication information is used to indicate that a configuration of uplink and/or downlink transmission directions in each of four periods included in 20 ms is the configuration indicated by the first indication information.

In another possible implementation, the base station 100 may be configured with the first parameter and the second parameter. The method may further include one of the following two steps.

107. When the first parameter is the first preset value, the base station 100 sends second indication information to the terminal 200 by using high layer signaling, where the second indication information carries the second parameter, and the second indication information is used to indicate that a configuration of uplink and/or downlink transmission directions in each period in the time duration indicated by the second parameter is the configuration indicated by the first indication information.

In this case, the base station 100 may send the second indication information in the semi-static configuration manner.

108. When the first parameter is the second preset value, the base station 100 sends second indication information to the terminal 200 by using at least one of MAC layer signaling or physical layer signaling, where the second indication information carries the second parameter, and the second indication information is used to indicate that a configuration of uplink and/or downlink transmission directions in each period in the time duration indicated by the second parameter is the configuration indicated by the first indication information.

In this case, the base station 100 may send the second indication information in the dynamic configuration manner.

In a possible implementation, the base station 100 may be configured with a third parameter, and the third parameter is used to indicate a time point. The method may further include the following step.

109. The base station 100 sends third indication information to the terminal 200 by using at least one of high layer signaling, MAC layer signaling, or physical layer signaling, where the third indication information carries the third parameter, and the third indication information is used to indicate that a configuration of uplink and/or downlink transmission directions in each period in a time domain after the time point indicated by the third parameter is the configuration indicated by the first indication information.

In a possible implementation, the base station 100 may be configured with the second parameter and the third parameter. The method may further include the following step.

1100. The base station 100 sends fourth indication information to the second device by using at least one of high layer signaling, MAC layer signaling, or physical layer signaling, where the fourth indication information carries the second parameter and the third parameter, and the fourth indication information is used to indicate that a configuration of uplink and/or downlink transmission directions in each period in the time duration that is indicated by the second parameter and that starts from the time point indicated by the third parameter is the configuration indicated by the first indication information.

In this way, the base station 100 may send the fourth indication information to the terminal 200 in the semi-static configuration manner or the dynamic configuration manner. The third parameter may be notified to the terminal 200 by using any one of high layer signaling, MAC layer signaling, or physical layer signaling. In other words, the base station 100 may configure uplink and/or downlink transmission directions in a window starting from a start time point.

In another possible implementation, the first indication information may further carry the first parameter. In another possible implementation, the base station 100 may be configured with the first parameter and the third parameter, and the third indication information carries the third parameter. In another possible implementation, the base station 100 is configured with the first parameter, the second parameter, and the third parameter, and the fourth indication information carries the second parameter and the third parameter. Other possible cases are not enumerated herein.

It is worth noting that in this embodiment of this application, the first indication information, the second indication information, the third indication information, and the fourth indication information may be sent to the terminal 200 by using any one of high layer signaling, MAC layer signaling, or physical layer signaling. Any one of the first parameter, the second parameter, and the third parameter may be carried in the first indication information, the second indication information, the third indication information, or the fourth indication information, or may be carried in other signaling; and may also be sent to the terminal 200 by using any one of high layer signaling, MAC layer signaling, or physical layer signaling.

In this embodiment of this application, there are many methods for the base station 100 to send the first indication information to the terminal 200 by using physical layer signaling. The following makes a description by using two methods as an example.

Method 1: The base station 100 sends the first indication information to the terminal 200 by using a preserved physical hybrid automatic repeat request indicator channel PHICH resource.

In the method, the base station 100 may preserve some PHICH resources, where the preserved PHICH resources are used for sending the first indication information during configuration of the uplink and/or downlink transmission directions, and the preserved PHICH resources may be notified by using high layer signaling. An indication bit in the first indication information may be processed as a PHICH bit, that is, may be modulated and repeated through binary phase shift keying (BPSK), and multiplexed and scrambled by using an orthogonal sequence. There is a predefined matching relationship between the orthogonal sequence and the preserved resources. The base station 100 may configure more than one PHICH resource for each indication bit in the first indication information. In this case, a plurality of PHICH resources may be grouped, and ($n_{PHICH}^{group}$, $n_{PHICH}^{seq}$) is used to indicate that a used PHICH is an $x^{th}$ resource in a group, and to indicate a sequence used for the resource. Herein the group information may be notified by using high layer signaling. In this case, the base station 100 may provide flexibility to balance indication bit performance and control signaling overheads. In the method, the base station 100 should take a corresponding measure, for example, by controlling physical uplink shared channel (PUSCH) resource allocation or demodulating a cyclic shift of a reference signal (RS), to avoid a conflict between a bit in the first indication information and a normal PHICH bit.

Method 2: The base station 100 sends the first indication information to the terminal 200 by using a preserved control channel element CCE resource in a physical downlink control channel PDCCH resource.

In the method, the base station 100 may preserve some CCE resources in a PDCCH resource, where the preserved CCE resources are used for sending the first indication information during configuration of the uplink and/or downlink transmission directions, and the preserved CCE resources may be notified by using high layer signaling. The indication bits in the first indication information may be encoded and modulated in a same manner as a physical control format indicator channel PCFICH, and are then mapped onto an RE in the preserved CCE resources. A manner of mapping the preserved CCE resources onto an actual physical resource complies with an existing PDCCH definition. The indication bits in the first indication information may also be used as new short downlink control information DCI. The new DCI is processed in a same manner as other normal DCI. Additional CRC may be scrambled by using a new radio network temporary identifier (RNTI) that is configured by the base station 100. The RNTI may be similar to a cell radio network temporary identifier (C-RNTI) of a terminal.

Method 3: The base station 100 sends the first indication information to the terminal 200 by using a newly added PDCCH resource.

In the method, the base station 100 may re-divide some CCE resources, where the re-divided CCE resources are used for sending the first indication information during configuration of the uplink and/or downlink transmission directions, and the re-divided CCE resources may be notified by using high layer signaling. The indication bits in the first indication information may be encoded and modulated in a same manner as a physical control format indicator channel PCFICH, and are then mapped onto an RE in the preserved CCE resources. A manner of mapping the re-divided CCE resources onto an actual physical resource complies with an existing PDCCH definition. The indication bits in the first indication information may also be used as new downlink control information DCI. The new DCI is processed in a same manner as other normal DCI. Additional CRC may be scrambled by using a new radio network temporary identifier that is configured by the base station 100. The RNTI may be used for paging a group of UEs, and/or a group of time domain resources, and/or a group of frequency domain resources. In other words, the RNTI needs to be used when a group of UEs, and/or a group of time domain resources, and/or a group of frequency domain resources are descrambled. The RNTI may be similar to a cell radio network temporary identifier C-RNTI of a terminal.

The newly added PDCCH resource needs to be notified by the first device to the second device, or needs to be pre-configured through OAM. The first device may notify the second device of the newly added PDCCH resource by using high layer signaling. The new PDCCH may be at least one of a group PDCCH, a common PDCCH, or a group common PDCCH. The new PDCCH is a particular PDCCH, defined for a group of UEs, or a group of time domain resources, or a group of frequency domain resources, to introduce new DCI.

In the foregoing methods, the base station 100 sends the first indication information on the preserved resource, so as not to increase blind detection on a side of the terminal 200. In addition, a PCFICH, PHICH, or DCI encoding mechanism in the prior art may be reused to achieve low implementation complexity in sending the first indication information.

Further, the base station 100 may be configured with two resource sets, namely, a first resource set and a second resource set. A transmission direction of a resource element in the first resource set is fixed, and a transmission direction of a resource element in the second resource set is variable. Certainly, the resource set herein may also be referred to as a resource group, a resource series, a resource subset, or the like.

In this embodiment of this application, resources may be divided based on the time domain granularity and the frequency domain granularity. Therefore, a specific form of a resource element whose transmission direction in the first resource set is fixed and a resource element whose transmission direction in the second resource set is variable may be a large granularity or may be a small granularity. The resource division manner is relatively flexible, so that an uplink or downlink transmission direction of a resource element that is obtained through division is more flexibly configured.

That a transmission direction of a resource element in the first resource set is fixed means that, for a resource element in the first resource set, a transmission direction specified in the configuration mode is a fixed direction. Particularly, the fixed direction may be a downlink direction, and is used to transmit important control information, for example, basic common control information such as synchronization information and broadcast information. In this way, the first resource set is obtained through division, so that important control information can be transmitted by using a resource element in the preserved first resource set, to improve system performance. For example, the terminal 200 may directly detect signaling in a particular resource element in the preserved first resource set, to quickly access a network. Optionally, a resource element in the first resource set may be notified in the semi-static or dynamic configuration manner; and specifically may be exchanged by using an interface between base stations, or may be notified to the terminal by using air interface signaling. Signaling exchanged by using the interface between the base stations or transmitted by using an air interface may be any one of high layer signaling, MAC signaling, or physical layer signaling. The notifying a resource element to the terminal by using air interface signaling includes: notifying, by the base station, the resource element to the terminal by using air interface signaling; and notifying, by the base station, the resource element to a second network device by using the interface between base stations, and notifying, by the second network device, the resource element to the terminal by using air interface signaling. In addition, the fixed direction may be an uplink direction, and is used to transmit important uplink information such as a scheduling requirement, a buffer status report (BSR), or a random access request (and a message 3).

Further, the method provided in this embodiment of this application may further include the following steps.

1101. The base station 100 sends a first notification message to the terminal 200, where the first notification message is used to inform that some or all resources in the second resource set are converted into the first resource set.

1102. The base station 100 sends a second notification message to the terminal 200, where the second notification message is used to inform that some or all resources in the first resource set are converted into the second resource set.

The sending, by the base station 100, a first notification message and/or a second notification message to the terminal 200 includes: sending, by the base station 100, the first notification message and/or the second notification message to the terminal 200 by using any one of high layer signaling, MAC layer signaling, or physical layer signaling.

In this way, the base station 100 may notify the terminal 200 of the first notification message and/or the second notification message by using high layer signaling in the semi-static configuration manner, or by using MAC layer signaling or physical layer signaling in the dynamic configuration manner.

In an optional implementation, the resources in the second resource set that are converted into the first resource set may be at least one of preserved time domain resources, frequency domain resources, or code resources. In this way, when a data amount of important control information needing to be transmitted is relatively large, some or all of preserved resources in the second resource set may be grouped into the first resource set to transmit the important control information. When a data amount of important control information needing to be transmitted is relatively small, resources that have been grouped from the second resource set into the first resource set may be re-grouped into the second resource set, so that resource configuration is more flexible.

In addition, in step 105, the sending, by the base station 100, initial configuration information to the terminal 200 may specifically include: sending, by the base station 100, the initial configuration information to the terminal 200 by using a resource element in the first resource set.

Because an amount of the initial configuration information is relatively large and the initial configuration information belongs to important system information, the initial configuration information may be transmitted by using a resource element in the first resource set.

In step 101, the sending, by the base station 100, first indication information to the terminal 200 may include:

sending, by the base station 100, the first indication information to the terminal 200 by using a resource element in at least one of the first resource set and the second resource set.

The first indication information may be sent to the terminal 200 by using a resource element in the first resource set, or by using a resource element in the second resource set, or by using a resource element in the first resource set and a resource element in the second resource set. When the first indication information is sent by using a resource element in the first resource set, because a transmission direction of the resource element is fixed, not only performance can be satisfied but also interference can be reduced.

Furthermore, it needs to be noted that, the configuration method provided in this embodiment of this application is transparent to the terminal, and therefore can be introduced to a network in a backward-compatible way.

In this embodiment of this application, unless otherwise particularly explained, the semi-static configuration is usually notified by using high layer signaling, for example, notified by using RRC signaling; and unless otherwise particularly explained, the dynamic configuration is usually notified by using physical layer signaling or MAC layer signaling.

In this embodiment of this application, description is made by using an example in which the first device is the base station 100. When the first device is the base station 100, the second device is not limited to the terminal 200, and the second device may alternatively be another base station, for example, the base station 300. In addition, the first device may be a terminal, and the second device in this case may be another terminal.

In addition, it needs to be noted that this embodiment of the present disclosure is not limited to a low frequency system, and may also be applied to a high-frequency millimeter wave system. Therefore, both the foregoing related indication information and the resource allocation or the like may be based on beamforming or may correspond to a beam identifier. In other words, all related indication information and resource sets or subsets each may further carry a beam identifier. The beam identifier may be a beam index, or an identifier of a synchronization signal corresponding to a beam, or an identifier of a reference signal. The identifier of the synchronization signal or the identifier of the reference signal may be a time identifier related to the synchronization signal or the reference signal, for example, a synchronization signal block time index.

The distribution in the present disclosure may also be referred to as a structure. The first parameter may be a period, or may be another parameter different from a period. The first parameter may be configured by using at least one of high layer signaling, MAC layer signaling, or physical layer signaling. When the first parameter is configured by using high layer signaling, specifically, the first parameter may be notified by using system information.

The solutions provided in the embodiments of this application are described mainly from a perspective of interaction between network elements. It may be understood that, to implement the foregoing functions, the first device and the second device include corresponding hardware structures and/or software modules for executing these functions. Persons of ordinary skill in the art should easily be aware that, in combination with the examples described in the embodiments disclosed in this specification, units and algorithm steps may be implemented by hardware or a combination of hardware and computer software in the embodiments of this application. Whether a function is performed by hardware or hardware driven by computer software depends on particular applications and design constraints of the technical solutions. Persons skilled in the art may use different methods to implement the described functions for each particular application, but it should not be considered that the implementation goes beyond the scope of this application.

Functional module division may be performed on the first device and the second device according to the foregoing method examples in the embodiments of this application. For example, various functional modules may be divided based on various functions, or two or more functions may be integrated into one processing module. The integrated module may be implemented in a form of hardware, or may be implemented in a form of a software functional module. It needs to be noted that the module division in the embodiments of this application is an example, and is merely logical function division and there may be another division manner in actual implementation.

Figure 13:
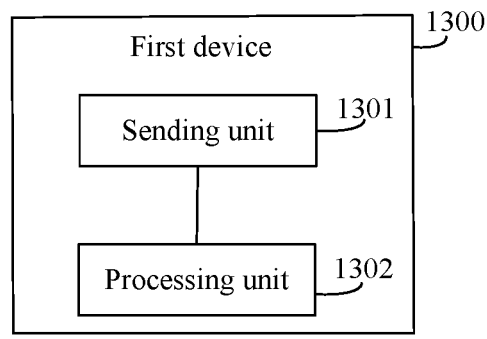
FIG. 13 is a schematic structural diagram of a first device according to an embodiment of this application.

For example, FIG. 13 is a schematic structural diagram of a first device 1300 when various functional modules are divided based on various functions. The first device 1300 may include a sending unit 1301 and a processing unit 1302. The sending unit 1301 may be configured to send first indication information to a second device. The first indication information is used to indicate a configuration of uplink and/or downlink transmission directions, the configuration is used to describe types, a number, and distribution of resource elements included in one period, the resource element is a resource that is obtained through division based on a resource granularity, the resource granularity includes a time domain granularity, the time domain granularity includes a resource unit smaller than one orthogonal frequency division multiplexing OFDM symbol, an OFDM symbol, a mini slot, a slot, a mini subframe, a subframe, a radio frame, or a super frame, the types of the resource elements include an uplink resource element, a downlink resource element, and a switch resource element between the downlink resource element and the uplink resource element, a transmission direction of the uplink resource element is an uplink direction, and a transmission direction of the downlink resource element is a downlink direction. The processing unit 1302 may be configured to perform information transmission based on the configuration, indicated by the first indication information, of the uplink and/or downlink transmission directions. In addition, the sending unit 1301 may be further configured to perform step 1010 shown in FIG. 9, step 105 shown in FIG. 10, and step 1011 and step 1012 shown in FIG. 12, and/or configured to support other processes of the technologies described in this specification. All related content of the steps in the foregoing method embodiments may be referenced and applied to function descriptions of corresponding functional modules, and details are not described herein again.

Figure 14:
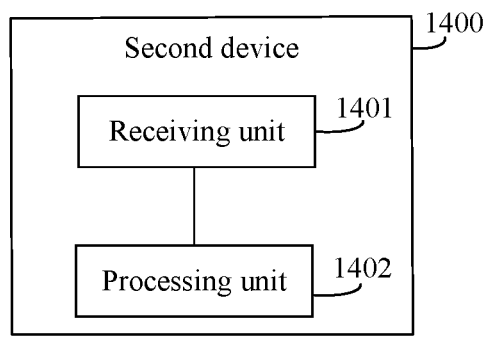
FIG. 14 is a schematic structural diagram of a second device according to an embodiment of this application.

FIG. 14 is a schematic structural diagram of a second device 1400 when various functional modules are divided based on various functions. The second device 1400 may include a receiving unit 1401 and a processing unit 1402. The receiving unit 1401 may be configured to receive first indication information sent by a first device. The first indication information is used to indicate a configuration of uplink and/or downlink transmission directions, the configuration is used to describe types, a number, and distribution of resource elements included in one period, the resource element is a resource that is obtained through division based on a resource granularity, the resource granularity includes a time domain granularity, the time domain granularity includes a resource unit smaller than one orthogonal frequency division multiplexing OFDM symbol, an OFDM symbol, a mini slot, a slot, a mini subframe, a subframe, a radio frame, or a super frame, the types of the resource elements include an uplink resource element, a downlink resource element, and a switch resource element between the downlink resource element and the uplink resource element, a transmission direction of the uplink resource element is an uplink direction, and a transmission direction of the downlink resource element is a downlink direction. The processing unit 1402 may be configured to perform information transmission or a configuration operation based on the configuration, indicated by the first indication information, of the uplink and/or downlink transmission directions. All related content of the steps in the foregoing method embodiments may be referenced and applied to function descriptions of corresponding functional modules, and details are not described herein again.

The first device and the second device provided in the embodiments of this application are configured to perform the transmission direction configuration method, and therefore can achieve same effects as the transmission direction configuration method.

Figure 15:
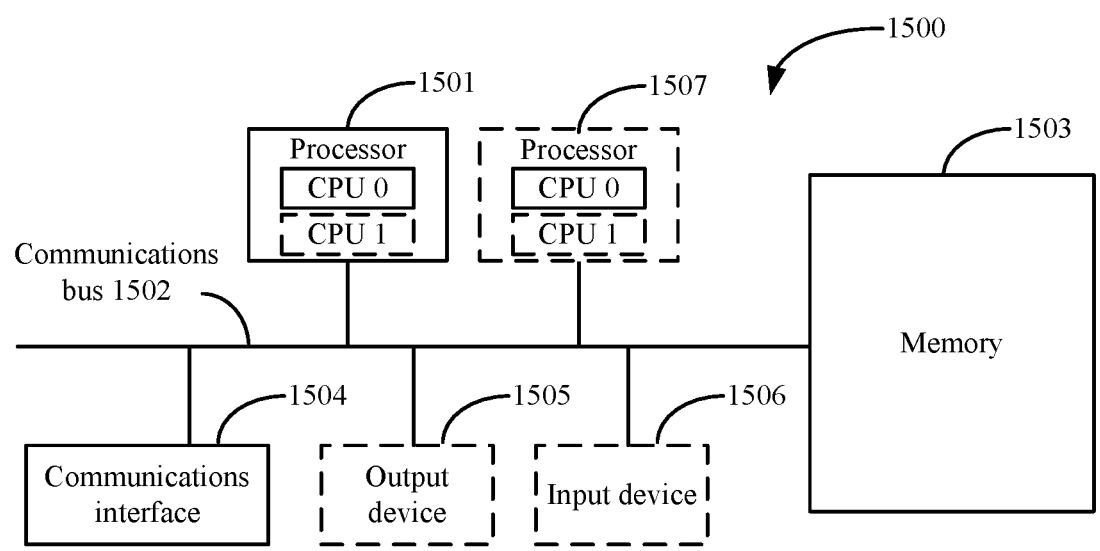
FIG. 15 is a schematic structural diagram of an apparatus according to an embodiment of this application.

In a simple embodiment, persons skilled in the art may consider that either the first device 1300 or the second device 1400 may be implemented by using a structure shown in FIG. 15.

As shown in FIG. 15, an apparatus 1500 may include at least one processor 1501, a communications bus 1502, a memory 1503, and at least one communications interface 1504.

The processor 1501 may be a general purpose central processing unit (CPU), a microprocessor, an application-specific integrated circuit (ASIC), or one or more integrated circuits for controlling execution of a program in a solution of this application.

The communications bus 1502 may include a path for information transfer between the foregoing components.

The communications interface 1504 uses any transceiver-like apparatus to communicate with another device or a communications network, such as an Ethernet, a radio access network (RAN), or a wireless local area network (WLAN).

The memory 1503 may be a read-only memory (ROM), another type of static storage device that can store static information and instructions, a random access memory (RAM), or another type of dynamic storage device that can store information and instructions; or may be an electrically erasable programmable read-only memory (EEPROM), a compact disc read-only memory (CD-ROM) or another optical disk storage medium, an optical disc storage medium (including a compact disc, a laser disc, an optical disc, a digital versatile disc, a blue-ray optical disc, and the like), a magnetic disk storage medium or another magnetic storage device, or any other computer accessible medium that can be used to carry or store expected program code in an instruction or data structure form, but is not limited thereto. The memory may exist independently, and is connected to the processor by using the bus. The memory may alternatively be integrated with the processor.

The memory 1503 is configured to store and execute application program code of a solution in this application, and the processor 1501 controls the execution of the application program code. The processor 1501 is configured to execute the application program code stored in the memory 1503, to implement the configuration method in the foregoing embodiments.

During specific implementation, in an embodiment, the processor 1501 may include one or more CPUs, for example, a CPU 0 and a CPU 1 in FIG. 15.

During specific implementation, in an embodiment, the apparatus 1500 may include a plurality of processors, for example, the processor 1501 and a processor 1507 in FIG. 15. Each of the processors may be a single-core (single-CPU) processor, or may be a multi-core (multi-CPU) processor. The processors herein may be one or more devices, circuits, and/or processing cores for processing data (e.g., computer program instructions).

During specific implementation, in an embodiment, the apparatus 1500 may further include an output device 1505 and an input device 1506. The output device 1505 communicates with the processor 1501, and may display information in a plurality of manners. For example, the output device 1505 may be a liquid crystal display (LCD), a light emitting diode (LED) display device, a cathode ray tube (CRT) display device, a projector, or the like. The input device 1506 communicates with the processor 1501, and may accept a user's input in a plurality of manners. For example, the input device 1506 may be a mouse, a keyboard, a touchscreen device, a sensor device, or the like.

Another embodiment of this application provides a computer readable storage medium, which may be configured to store a computer software instruction used for the first device, so that when the computer software instruction is run on a computer, the computer performs the foregoing configuration method.

Another embodiment of this application provides a computer readable storage medium, configured to store a computer software instruction used for the second device, so that when the computer software instruction is run on a computer, the computer performs the foregoing configuration method.

Another embodiment of this application provides a computer program product including an instruction, so that when the instruction is run on a first device, the first device performs the foregoing configuration method.

Another embodiment of this application provides a computer program product including an instruction, so that when the instruction is run on a second device, the second device performs the foregoing configuration method.

Another embodiment of this application provides a computer program product including an instruction, so that when the instruction is run on a first device, a computer performs the foregoing configuration method.

Another embodiment of this application provides a computer program product including an instruction, so that when the instruction is run on a second device, the second device performs the foregoing configuration method.

Another embodiment of this application provides a system. The system may include the first device and the second device for performing the foregoing configuration method. For example, for a schematic structural diagram of the system, refer to FIG. 4. The base station 100 may be the first device, the terminal 200 may be the second device, or the base station 300 may be the second device.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the processes or functions according to the embodiments of this application are all or partially generated. The computer may be a general purpose computer, a dedicated computer, a computer network, or another programmable apparatus. The computer instruction may be stored in a computer readable storage medium or may be transmitted from a computer readable storage medium to another computer readable storage medium. For example, the computer instruction may be transmitted from a website, computer, server, or data center to another website, computer, server, or data center in a wired (e.g., a coaxial cable, an optical fiber, or a digital subscriber line (DSL)) or wireless (e.g., infrared, radio, microwave, or the like) manner. The computer readable storage medium may be any usable medium accessible by a computer, or a data storage device, such as a server or a data center, integrating one or more usable media. The usable medium may be a magnetic medium (e.g., a floppy disk, a hard disk, or a magnetic tape), an optical medium (e.g., a DVD), a semiconductor medium (e.g., a solid-state disk (SSD)), or the like.

Although this application is described with reference to the embodiments, in a process of implementing this application that claims protection, persons skilled in the art may understand and implement other variations of the disclosed embodiments by viewing the accompanying drawings, disclosed content, and the accompanying claims. In the claims, "comprising" does not exclude another component or another step, and "a" or "one" does not exclude a case of a plurality of. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, obviously, various modifications and combinations may be made to this application without departing from scope of this application. Correspondingly, this specification and the accompanying drawings are merely example descriptions of this application defined by the accompanying claims, and are considered as any of or all modifications, variations, combinations or equivalents that cover the scope of this application. Obviously, persons skilled in the art may make various modifications and variations to this application without departing from scope of this application. This application is intended to cover these modifications and variations of this application provided that they fall within the scope of protection defined by the following claims and their equivalent technologies.

The invention claimed is:

1. A transmission direction configuration method carried out by a terminal device, comprising:
   receiving initial configuration information from a network device through a radio resource control (RRC) signaling, wherein the initial configuration information comprises a correspondence between at least one index value and at least one corresponding transmission direction configuration of an indexed list of transmission directions configuration;
   receiving first indication information from the network device through a physical downlink control channel (PDCCH), wherein the first indication information comprises an index value of the at least one index value,
   wherein the at least one transmission direction configuration of an indexed list of transmission directions configuration is used to indicate a configuration of uplink and/or downlink transmission directions, wherein the configuration is used to describe types, a number, and distribution of resource elements comprised in each period in a time duration that is indicated by a parameter and that starts from a time point associated with the first indication information, wherein the time duration includes N periods, wherein N is a positive integer, wherein the resource element is a resource that is obtained through division based on a resource granularity, wherein the resource granularity comprises a time domain granularity, wherein the time domain granularity comprises an orthogonal frequency division multiplexing (OFDM) symbol, wherein the types of the resource elements comprise an uplink resource element, a downlink resource element, and a switch resource element between the downlink resource element and the uplink resource element; wherein a transmission direction of the uplink resource element is an uplink direction, and wherein a transmission direction of the downlink resource element is a downlink direction; and performing an information transmission or a configuration operation based on the configuration, indicated by the first indication information, of the uplink and/or downlink transmission directions.

2. The method according to claim 1, wherein the parameter is carried in second indication information, and wherein the second indication information is received from the network device through high layer signaling and physical layer signaling.

3. The method according to claim 1, wherein that the configuration is used to describe types, a number, and distribution of resource elements comprises:

the configuration is used to describe types, a number, and distribution of resource elements comprised in a current period or in a $k^{th}$ period after a current period, and wherein k is a positive integer.

4. The method according to claim 1, wherein the method further comprises:

receiving an indication of the period from the network device through high layer signaling, and wherein the period is configured in a semi-static manner.

5. The method according to claim 1, wherein each entry of the indexed list of transmission directions configuration specifies a set of transmission directions for symbols.

6. The method according to claim 1, wherein the receiving the first indication information from the network device through a PDCCH comprises:

receiving the first indication information through a group common PDCCH.

7. The method according to claim 1, wherein the switch resource element between the downlink resource element and the uplink resource element is a gap.

8. A terminal device adapted to communicate with a network device, comprising at least one processor, and a memory, wherein the memory stores an execution instruction; and the at least one processor executes the execution instruction to cause the terminal device to perform the steps:

receiving initial configuration information from a network device through a radio resource control (RRC) signaling, wherein the initial configuration information comprises a correspondence between at least one index value and at least one corresponding transmission direction configuration of an indexed list of transmission directions configuration;

receiving first indication information from the network device through a physical downlink control channel (PDCCH), wherein the first indication information comprises an index value of the at least one index value, wherein the at least one transmission direction configuration of an indexed list of transmission directions configuration is used to indicate a configuration of uplink and/or downlink transmission directions, wherein the configuration is used to describe types, a number, and distribution of resource elements comprised in each period in a time duration that is indicated by a parameter and that starts from a time point associated with the first indication information, wherein the time duration includes N periods, wherein N is a positive integer, wherein the resource element is a resource that is obtained through division based on a resource granularity, wherein the resource granularity comprises a time domain granularity, wherein the time domain granularity comprises an orthogonal frequency division multiplexing (OFDM) symbol, wherein the types of the resource elements comprise an uplink resource element, a downlink resource element, and a switch resource element between the downlink resource element and the uplink resource element; wherein a transmission direction of the uplink resource element is an uplink direction, and wherein a transmission direction of the downlink resource element is a downlink direction; and performing an information transmission or a configuration operation based on the configuration, indicated by the first indication information, of the uplink and/or downlink transmission directions.

9. The terminal device according to claim 8, wherein the parameter is carried in second indication information, and wherein the second indication information is received from the network device through high layer signaling and physical layer signaling.

10. The terminal device according to claim 8, wherein that the configuration is used to describe types, a number, and distribution of resource elements comprises:

the configuration is used to describe types, a number, and distribution of resource elements comprised in a current period or in a $k^{th}$ period after a current period, and wherein k is a positive integer.

11. The terminal device according to claim 8, wherein the steps further comprises:

receiving an indication of the period from the network device through high layer signaling, and wherein the period is configured in a semi-static manner.

12. The terminal device according to claim 8, wherein each entry of the indexed list of transmission directions configuration specifies a set of transmission directions for symbols.

13. The terminal device according to claim 8, wherein the receiving the first indication information from the network device through a PDCCH comprises:

receiving the first indication information through a group common PDCCH.

14. The terminal device according to claim 8, wherein the switch resource element between the downlink resource element and the uplink resource element is a gap.

15. A computer readable medium comprising instructions which, when executed by a computer, cause the computer to carry out the steps of:

receiving initial configuration information from a network device through a radio resource control (RRC) signaling, wherein the initial configuration information comprises a correspondence between at least one index value and at least one corresponding transmission direction configuration of an indexed list of transmission directions configuration;

receiving first indication information from the network device through a physical downlink control channel (PDCCH), wherein the first indication information comprises an index value of the at least one index value, wherein the at least one transmission direction configuration of an indexed list of transmission directions configuration is used to indicate a configuration of uplink and/or downlink transmission directions, wherein the configuration is used to describe types, a number, and distribution of resource elements comprised in each period in a time duration that is indicated by a parameter and that starts from a time point associated with the first indication information, wherein the time duration includes N periods, wherein N is a positive integer, wherein the resource element is a resource that is obtained through division based on a resource granularity, wherein the resource granularity comprises a time domain granularity, wherein the time domain granularity comprises an orthogonal frequency division multiplexing (OFDM) symbol, wherein the types of the resource elements comprise an uplink resource element, a downlink resource element, and a switch resource element between the downlink resource element and the uplink resource element; wherein a transmission direction of the uplink resource element is an uplink direction, and wherein a transmission direction of the downlink resource element is a downlink direction; and performing an information transmission or a configuration operation based on the configuration, indicated by the first indication information, of the uplink and/or downlink transmission directions.

16. The computer readable medium according to claim 15, wherein the parameter is carried in second indication information, and wherein the second indication information is received from the network device through high layer signaling and physical layer signaling.

17. The computer readable medium according to claim 15, wherein that the configuration is used to describe types, a number, and distribution of resource elements comprises:

the configuration is used to describe types, a number, and distribution of resource elements comprised in a current period or in a $k^{th}$ period after a current period, and wherein k is a positive integer.

18. The computer readable medium according to claim 15, wherein the steps further comprises:

receiving an indication of the period from the network device through high layer signaling, and wherein the period is configured in a semi-static manner.

19. The computer readable medium according to claim 15, wherein each entry of the indexed list of transmission directions configuration specifies a set of transmission directions for symbols.

* * * * *